(12) United States Patent
Lee et al.

(10) Patent No.: US 10,250,806 B2
(45) Date of Patent: Apr. 2, 2019

(54) ELECTRONIC DEVICE AND METHOD FOR CONTROLLING IMAGE SHOOTING AND IMAGE OUTPUTTING

(71) Applicant: Samsung Electronics Co., Ltd, Gyeonggi-do (KR)

(72) Inventors: Sung-Hyup Lee, Gyeonggi-do (KR); Ji-Eun Kang, Gyeonggi-do (KR); Jae-Hun Ko, Seoul (KR); Il-Young Kim, Gyeonggi-do (KR); Jeong-Seob Kim, Daegu (KR); Soon-Sang Park, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

(21) Appl. No.: 15/256,602

(22) Filed: Sep. 4, 2016

(65) Prior Publication Data

US 2017/0070676 A1    Mar. 9, 2017

(30) Foreign Application Priority Data

Sep. 4, 2015  (KR) .................. 10-2015-0125674

(51) Int. Cl.
*H04N 5/225* (2006.01)
*H04N 5/232* (2006.01)
*H04N 9/31* (2006.01)

(52) U.S. Cl.
CPC ....... *H04N 5/23245* (2013.01); *H04N 5/2254* (2013.01); *H04N 5/2257* (2013.01); *H04N 5/2258* (2013.01); *H04N 5/232* (2013.01); *H04N 5/23241* (2013.01); *H04N 5/23293* (2013.01); *H04N 9/3176* (2013.01)

(58) Field of Classification Search
CPC .. H04N 5/2254; H04N 5/2257; H04N 5/2258; H04N 5/232; H04N 5/23241; H04N 5/23245; H04N 5/23293; H04N 5/74; H04N 9/3176
USPC ........ 348/331.1, 362, 36, 37, 158, 151, 153, 348/143, 211.1, 633, 331, 159, 211.2
See application file for complete search history.

(56) References Cited

U.S. PATENT DOCUMENTS

| | | | |
|---|---|---|---|
| 8,477,184 B2 | 7/2013 | Hollinger | |
| 8,922,589 B2 | 12/2014 | Laor | |
| 2008/0259289 A1* | 10/2008 | Nozaki | G03B 17/00 353/70 |
| 2009/0040291 A1* | 2/2009 | McCall | H04N 7/00 348/36 |
| 2013/0242041 A1 | 9/2013 | Hollinger | |
| 2014/0063312 A1 | 3/2014 | Davis et al. | |

(Continued)

FOREIGN PATENT DOCUMENTS

| | | |
|---|---|---|
| JP | 5076595 | 11/2012 |
| KR | 10-0958584 | 5/2010 |

Primary Examiner — Marly S Camargo

(57) ABSTRACT

The present disclosure relates to an electronic device, and particularly, to an electronic device and a method for controlling image shooting and image outputting. To this end, the present disclosure provides a method for controlling image shooting and image outputting in an electronic device. The method includes: determining whether the electronic device is in an image shooting or image outputting; and controlling a function associated with the determined image shooting or image outputting to be performed through a single lens contained in the electronic device.

19 Claims, 17 Drawing Sheets

(56) References Cited

U.S. PATENT DOCUMENTS

2014/0111608 A1  4/2014  Pfeil
2014/0168443 A1  6/2014  Aguilar et al.
2015/0036023 A1* 2/2015  Gilbert ................ H04N 5/2354
                                                348/234

* cited by examiner

US 10,250,806 B2

ELECTRONIC DEVICE AND METHOD FOR CONTROLLING IMAGE SHOOTING AND IMAGE OUTPUTTING

CROSS-REFERENCE TO RELATED APPLICATION(S) AND CLAIM OF PRIORITY

The present application is related to and claims the priority under 35 U.S.C. § 119(a) to Korean Application Serial No. 10-2015-0125674, which was filed in the Korean Intellectual Property Office on Sep. 4, 2015, the entire content of which is hereby incorporated by reference.

TECHNICAL FIELD

The present disclosure relates to an electronic device, and particularly, to an electronic device and a method for controlling image shooting and image outputting.

BACKGROUND

Recently, various services and additional functions provided by an electronic device have been gradually expanded. To increase the effective values of electronic devices and to meet various desires of users, electronic devices have been continuously developed. Also, recently released electronic devices, such as a portable phone, a smart phone, a tablet Personal Computer (PC), a note PC, and the like, basically contain a small camera. The small camera may be used to shoot a still image or to shoot (or record) a video. As described above, an electronic device may obtain an image through a single camera or may obtain an image through the combination of a plurality of cameras.

SUMMARY

Conventionally, to obtain an image through an electronic device, the electronic device acquires an image through a camera contained in the electronic device. However, to output the image, a separate external device is needed, which is inconvenient.

Also, although the electronic device includes a projector function that outputs an image, when the electronic device outputs an image, the electronic device may not simultaneously perform image outputting and image shooting.

Also, the conventional electronic device is in an angled shape, such as a hexahedron, and thus, it has a limitation in freely moving. The electronic device is difficult to stick, through an external cover, to a surface, such as a wall surface, glass, and the like, which is a drawback. In addition, the electronic device may not simultaneously perform image shooting and image outputting through two single lenses, which is a drawback.

Therefore, there is a desire for a method of performing image shooting and image outputting through a single lens (or the same lens) in parallel, and for a method of shooting an image through a first single lens in parallel with outputting an image through a second single lens.

To address the above-discussed deficiencies, it is a primary object to provide an electronic device and a method of controlling image shooting and image outputting.

To this end, the present disclosure provides a method for an electronic device to control image shooting and image outputting. The method includes: determining whether the electronic device is in an image shooting or image outputting; and controlling a function associated with the determined image shooting or image outputting to be performed through a single lens contained in the electronic device.

Also, to this end, the present disclosure provides an electronic device that controls image shooting and image outputting. The electronic device includes: a lens unit; and a controller configured to determine an image shooting or image outputting, and to control a function associated with the determined out of the image shooting or the image outputting to be performed through a single lens contained in the lens unit.

According to the present disclosure, image shooting and image outputting are performed in parallel through a single lens (or the same lens), and a process of shooting an image through a first single lens is performed in parallel with a process of outputting an image through a second single lens. Accordingly, a new shooting experience may be provided to a user, and a shot image may be shared in real time and may be output in a wide screen so that it is convenient to the user.

Also, according to the present disclosure, a user may be provided with a detector function, such as a CCTV, and a projector function by installing an external electronic device to an electronic device, attaching the electronic device to a wall surface, ceiling, or the like, and shooting and outputting an image.

Also, by attaching the electronic device to a flight vehicle, such as a drone, an image may be shot in a free space and the shot image may be output.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
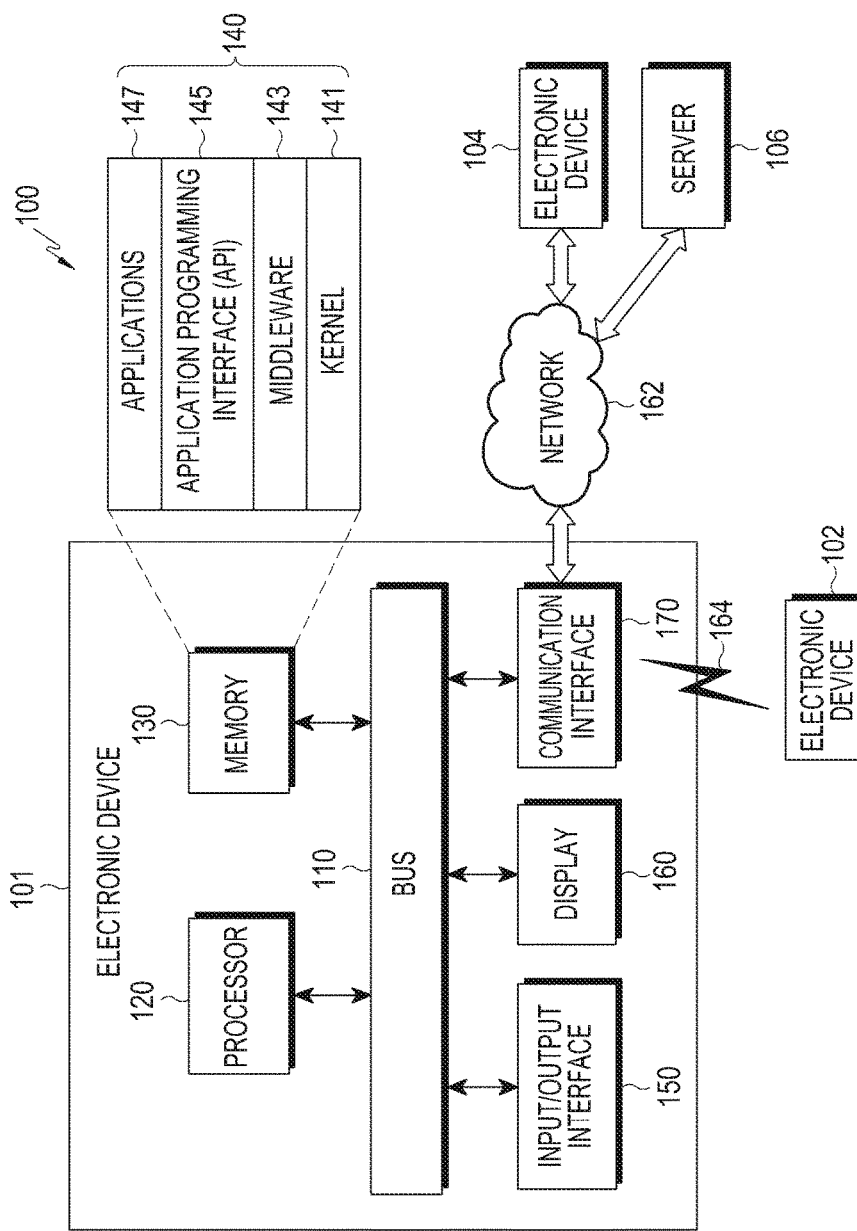
FIG. 1 illustrates an electronic device in a network environment, according to various embodiments of the present disclosure.

FIGS. 1 through 14B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., SAMSUNG HOMESYNC, APPLE TV®, or GOOGLE TV®), a game console (e.g., XBOX® and PLAYSTATION®), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MM), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

FIG. 1 illustrates an electronic device 101 in a network environment 100, according to various embodiments of the present disclosure;

The electronic device 101 may include a bus 110, a processor 120, a memory 130, an input/output interface 150, a display 160, and a communication interface 170. According to an embodiment of the present disclosure, the electronic device 101 may omit at least one of the elements, or may further include other elements.

The bus 110 may include, for example, a circuit that interconnects the elements 110 to 170 and delivers communication (e.g., a control message and/or data) between the elements 110 to 170.

The processor 120 may include one or more of a central processing unit (CPU), an application processor (AP), and a communication processor (CP). The processor 120, for example, may carry out operations or data processing relating to control and/or communication of at least one other element of the electronic device 101.

The memory 130 may include a volatile and/or non-volatile memory. The memory 130 may store, for example, instructions or data relevant to at least one other element of the electronic device 101. According to an embodiment of the present disclosure, the memory 130 may store software and/or a program 140. The program 140 may include, for example, a kernel 141, middleware 143, an application programming interface (API) 145, and/or application programs (or "applications") 147. At least some of the kernel 141, the middleware 143, and the API 145 may be referred to as an operating system (OS).

For example, the kernel 141 may control or manage the system resources (e.g., the bus 110, the processor 120, the memory 130, etc.) that are used to execute operations or functions implemented in the other programs (e.g., the middleware 143, the API 145, and the application programs 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

Furthermore, the middleware 143 may process one or more task requests, which are received from the application programs 147, according to priorities thereof. For example, the middleware 143 may assign at least one of the application programs 147 priorities in association with the use of the system resources (e.g., the bus 110, the processor 120, the memory 130, etc.) of the electronic device 101. For example, the middleware 143 may perform scheduling or loading balancing on the one or more task requests by processing the one or more task requests according to the priorities assigned to the at least one of the application programs.

The API 145, which is an interface through which the applications 147 control functions provided from the kernel 141 or the middleware 143, may include, for example, at least one interface or function (e.g., instruction) for file control, window control, image processing, text control, etc.

The input/output interface 150 may function as, for example, an interface that may transfer instructions or data, which are input from a user or an external device, to the other element(s) of the electronic device 101. Furthermore, the input/output interface 150 may output the instructions or data received from the other element(s) of the electronic device 101 to a user or another external device.

The display 160 may include, for example, a liquid crystal display (LCD), a light-emitting diode (LED) display, an organic light-emitting diode (OLED) display, a micro electro mechanical systems (MEMS) display, or an electronic paper display. The display 160 may display, for example, various types of contents (e.g., text, images, videos, icons, symbols, etc.) for a user. The display 160 may include a touch screen and may receive, for example, a touch, gesture, proximity, or hovering input using an electronic pen or a user's body part.

The communication interface 170 may configure communication, for example, between the electronic device 101 and an external device (e.g., a first external electronic device 102, a second external electronic device 104, or a server 106). For example, the communication interface 170 may be connected to a network 162 through wireless or wired communication to communicate with an external device (e.g., the second external electronic device 104 or the server 106).

The wireless communication may use, for example, at least one of long term evolution (LTE), LTE-Advance (LTE-A), code division multiple access (CDMA), wideband CDMA (WCDMA), universal mobile telecommunications system (UMTS), wireless broadband (WiBro), global system for mobile communications (GSM), and the like, as a cellular communication protocol. In addition, the wireless communication may include, for example, short range communication 164. The short range communication 164 may include, for example, at least one of WI-FI®, BLUETOOTH®, near field communication (NFC), global navigation satellite system (GNSS), etc. The GNSS may include at least one of, for example, a global positioning system (GPS), a global navigation satellite system (GLONASS®), a BeiDou navigation satellite system (hereinafter referred to as "BEIDOU"), and a European global satellite-based navigation system (GALILEO), according to a use area, a bandwidth, or the like. Hereinafter, in the present disclosure, the "GPS" may be interchangeably used with the "GNSS". The wired communication may include, for example, at least one of a universal serial bus (USB), a high definition multimedia interface (HDMI), recommended standard 232 (RS-232), a plain old telephone service (POTS), and the like. The network 162 may include a telecommunication network, for example, at least one of a computer network (e.g., a LAN or a WAN), the Internet, and a telephone network.

Each of the first and second external electronic devices 102 and 104 may be of a type that is the same as, or different from, the electronic device 101. According to an embodiment of the present disclosure, the server 106 may include a group of one or more servers. According to various embodiments of the present disclosure, all or some of the operations executed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or by request, the electronic device 101 may request another device (e.g., the electronic device 102 or 104 or the server 106) to perform at least some functions relating thereto instead of, or in addition to, performing the functions or services by itself. The other electronic device (e.g., the electronic device 102 or 104 or the server 106) may perform the requested functions or the additional functions and may transfer the result of the execution to the electronic device 101. The electronic device 101 may provide the received result as it is, or may additionally process the received result to provide the requested functions or services. To this end, for example, cloud computing, distributed computing, or client-server computing technology may be used.

Figure 2:
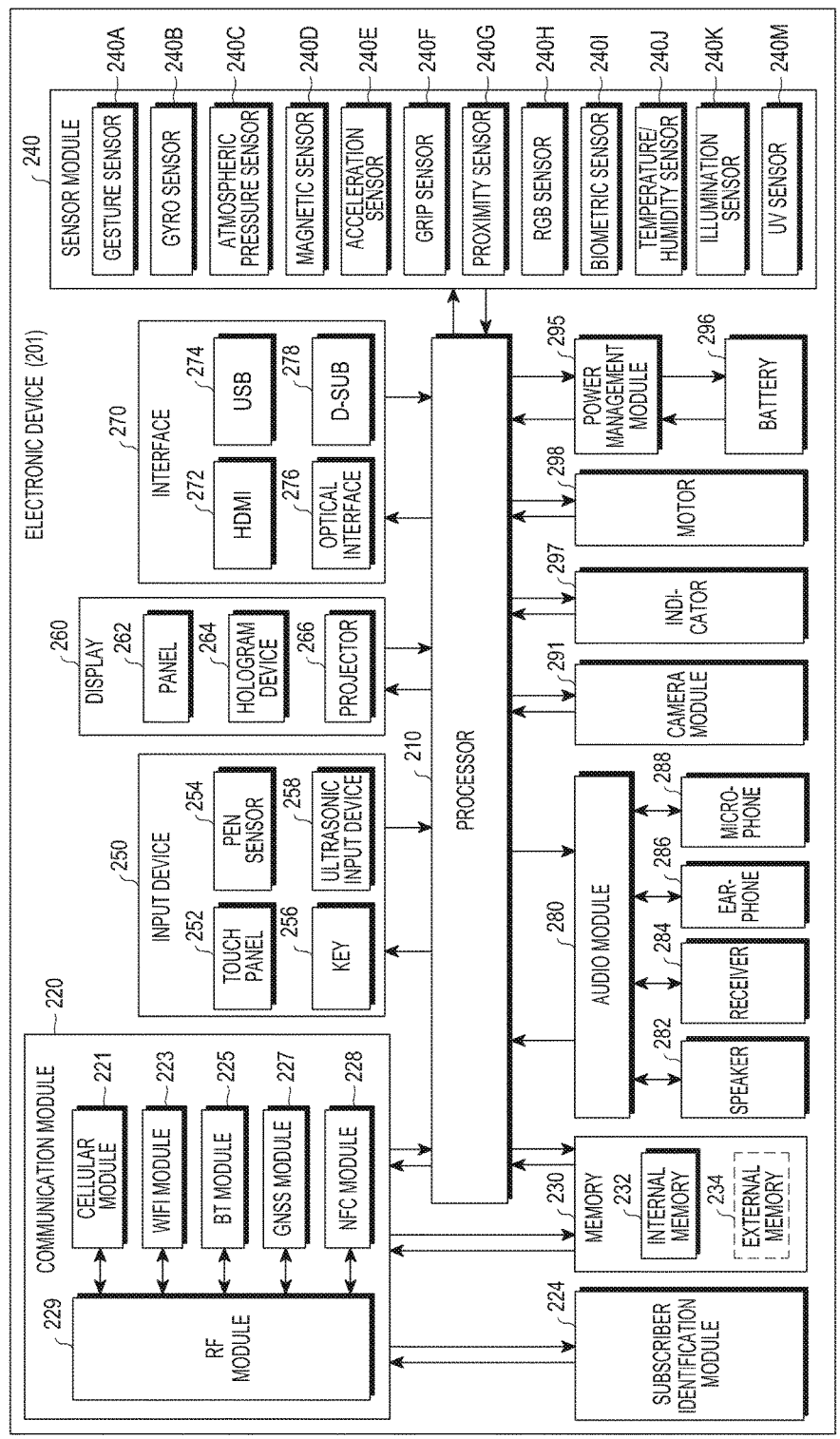
FIG. 2 illustrates a block diagram of an electronic device according to various embodiments of the present disclosure.

FIG. 2 illustrates a block diagram of an electronic device 201 according to various embodiments of the present disclosure.

The electronic device 201 may include, for example, the entirety or a part of the electronic device 101 of FIG. 1. The electronic device 201 may include at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may drive, for example, an operating system or application programs to control a plurality of hardware or software elements connected thereto and may perform various types of data processing and operations. The processor 210 may be embodied, for example, as a System on Chip (SoC). According to an embodiment of the present disclosure, the processor 210 may further include a graphic processing unit (GPU) and/or an image signal processor. The processor 210 may also include at least some (e.g., a cellular module 221) of the elements illustrated in FIG. 2. The processor 210 may load, in a volatile memory, instructions or data received from at least one of the other elements (e.g., a non-volatile memory) to process the loaded instructions or data, and may store various types of data in the non-volatile memory.

The communication module 220 may have a configuration that is the same as, or similar to, that of the communication interface 170 illustrated in FIG. 1. The communication module 220 may include, for example, a cellular module 221, a WI-FI® module 223, a BLUETOOTH® (BT) module 225, a GNSS module 227 (e.g., a GPS module, a GLONASS® module, a BEIDOU module, or a GALILEO module), an NFC module 228, and a Radio Frequency (RF) module 229.

The cellular module 221 may provide, for example, a voice call, a video call, a text message service, an Internet service, or the like through a communication network. According to an embodiment of the present disclosure, the cellular module 221 may identify and authenticate the electronic device 201 within a communication network using the subscriber identification module 224 (e.g., a SIM card). According to an embodiment of the present disclosure, the cellular module 221 may perform at least some of the functions that the processor 210 may provide. According to an embodiment of the present disclosure, the cellular module 221 may include a communication processor (CP).

The WI-FI® module 223, the BT module 225, the GNSS module 227, or the NFC module 228 may include, for example, a processor for processing data that is transmitted and received through a corresponding module. According to an embodiment of the present disclosure, at least some (two or more) of the cellular module 221, the WI-FI® module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a power amplifier module (PAM), a frequency filter, a low noise amplifier (LNA), an antenna, or the like. According to another embodiment of the present disclosure, at least one of the cellular module 221, the WI-FI® module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 or an external memory 234. The embedded memory 232 may include, for example, at least one of a volatile memory (e.g., a dynamic random access memory (DRAM), a static RAM (SRAM), a synchronous dynamic RAM (SDRAM), etc.) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, etc.), a hard disc drive, a solid state drive (SSD), etc.).

The external memory 234 may further include a flash drive, for example, a compact flash (CF), a secure digital (SD), a micro secure digital (Micro-SD), a mini secure digital (Mini-SD), an extreme Digital (xD), a multi-media card (MMC), a memory stick, or the like. The external memory 234 may be functionally and/or physically connected to the electronic device 201 through various interfaces.

The sensor module 240 may, for example, measure a physical quantity or detect the operating state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, and blue (RGB) sensor), a biometric sensor 240I, a temperature/humidity sensor 240J, an illumination sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments of the present disclosure, the electronic device 201 may further include a processor configured to control the sensor module 240 as a part of, or separately from, the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user.

The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (e.g., a microphone 288) to determine data corresponding to the detected ultrasonic waves.

The display 260 (e.g., the display 160) may include a panel 262, a hologram device 264, or a projector 266. The panel 262 may have a configuration that is the same as, or similar to, that of the display 160 illustrated in FIG. 1. The panel 262 may be embodied to be, for example, flexible, transparent, or wearable. The panel 262, together with the touch panel 252, may be embodied as a single module. The hologram device 264 may show a three dimensional image in the air by using an interference of light. The projector 266 may display an image by projecting light onto a screen. The screen may be located, for example, inside or outside the electronic device 201. According to an embodiment of the present disclosure, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included, for example, in the communication interface 170 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may, for example, convert a sound into an electrical signal, and vice versa. At least some elements of the audio module 280 may be included, for example, in the input/output interface 150 illustrated in FIG. 1. The audio module 280 may process sound information that is input or output through, for example, a speaker 282, a receiver 284, earphones 286, the microphone 288, or the like.

The camera module 291, for example, is a device that is capable of shooting a still image and a moving image. According to an embodiment of the present disclosure, the camera module 291 may include one or more image sensors (e.g., a front sensor or a back sensor), a lens, an image signal processor (ISP), or a flash (e.g., an LED, xenon lamp, or the like).

The power management module 295 may manage, for example, the power of the electronic device 201. The electronic device 201 may be an electronic device that is provided with power through a battery, but may not be limited thereto. According to an embodiment of the present disclosure, the power management module 295 may include a power management integrated circuit (PMIC), a charger integrated circuit (IC), or a battery or fuel gauge. The PMIC may have a wired and/or wireless charging method. The wireless charging method may include a magnetic resonance method, a magnetic induction method, an electromagnetic wave method, or the like. Additional circuits (e.g., a coil loop, a resonance circuit, a rectifier, or the like.) for wireless charging may be further included. The battery gauge may measure, for example, the residual quantity of the battery 296 and a voltage, current, or temperature while charging. The battery 296 may include, for example, a rechargeable battery and/or a solar battery.

The indicator 297 may indicate a particular state (e.g., a boot-up state, a message state, a charging state, or the like) of the electronic device 201 or a part (e.g., the processor 210) thereof. The motor 298 may convert an electrical signal into a mechanical vibration and may generate a vibration, a haptic effect, or the like. Although not illustrated, the electronic device 201 may include a processing unit (e.g., a GPU) for supporting a mobile TV. The processing unit for supporting the mobile TV may process media data according to a standard, such as digital multimedia broadcasting (DMB), digital video broadcasting (DVB), MEDIAFLO, or the like.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
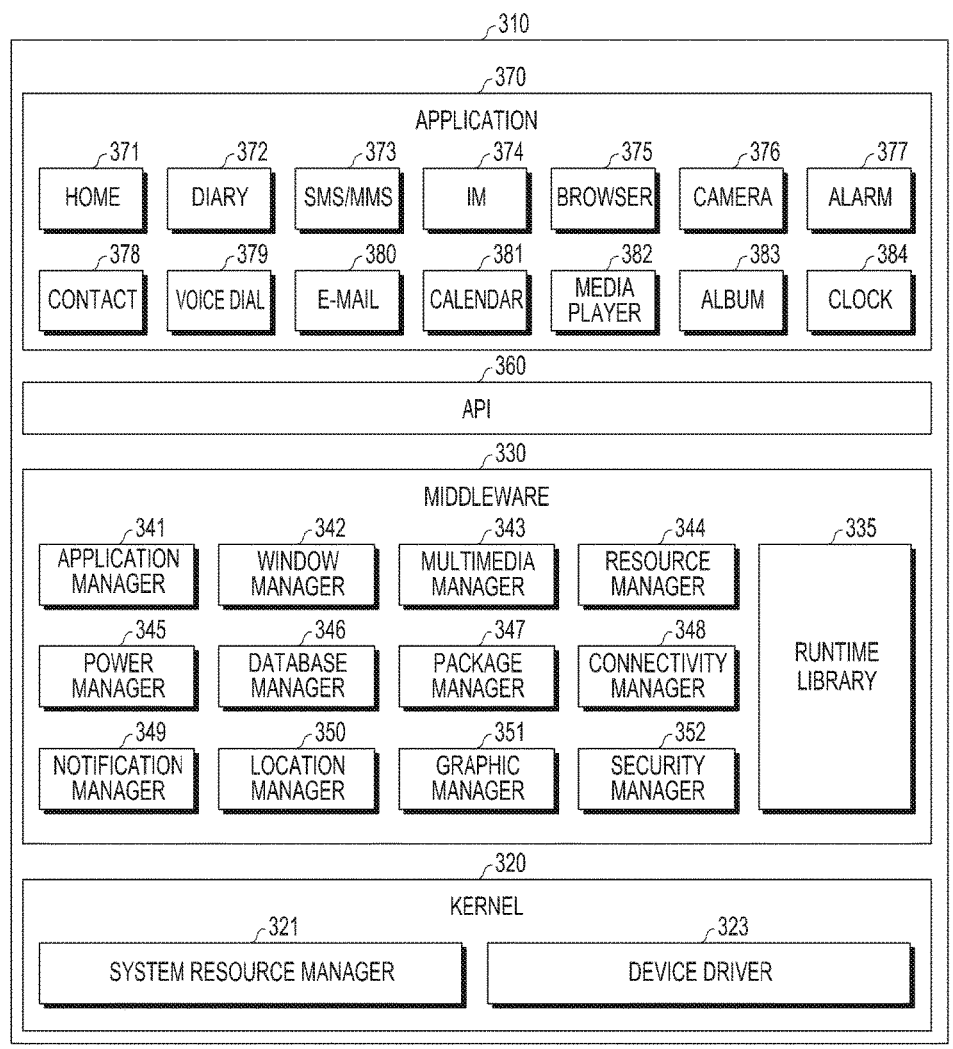
FIG. 3 illustrates a block diagram of a program module according to various embodiments of the present disclosure.

FIG. 3 illustrates a block diagram of a program module according to various embodiments of the present disclosure.

According to an embodiment of the present disclosure, the program module 310 (e.g., the program 140) may include an operating system (OS) that controls resources relating to an electronic device (e.g., the electronic device 101) and/or various applications (e.g., the application programs 147) that are executed in the operating system. The operating system may be, for example, ANDROID®, iOS®, WINDOWS®, SYMBIAN®, TIZEN®, SAMSUNG BADA®, or the like.

The program module 310 may include a kernel 320, middleware 330, an application programming interface (API) 360, and/or applications 370. At least a part of the program module 310 may be preloaded on the electronic device, or may be downloaded from an external electronic device (e.g., the electronic device 102 or 104 or the server 106).

The kernel 320 (e.g., the kernel 141) may include, for example, a system resource manager 321 and/or a device driver 323. The system resource manager 321 may control, allocate, or retrieve system resources. According to an embodiment of the present disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a WI-FI® driver, an audio driver, or an inter-process communication (IPC) driver.

The middleware 330 may provide a function required by the applications 370 in common, or may provide various functions to the applications 370 through the API 360 such that the applications 370 can efficiently use limited system resources within the electronic device. According to an embodiment of the present disclosure, the middleware 330 (e.g., the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may perform input/output management, memory management, the functionality for an arithmetic function, or the like.

The application manager 341 may manage, for example, the life cycle of at least one of the applications 370. The window manager 342 may manage graphical user interface (GUI) resources used on a screen. The multimedia manager 343 may determine formats required to reproduce various media files and may encode or decode a media file using a coder/decoder (codec) appropriate for a corresponding format. The resource manager 344 may manage resources, such as the source code, the memory, the storage space, and the like, of at least one of the applications 370.

The power manager 345 may operate together with, for example, a basic input/output system (BIOS) to manage a battery or power and provide power information required for the operation of the electronic device. The database manager 346 may generate, search, or change a database to be used by at least one of the applications 370. The package manager 347 may manage the installation or update of an application that is distributed in the form of a package file.

The connectivity manager 348 may manage a wireless connection, such as Wi-Fi, Bluetooth, or the like. The notification manager 349 may display or notify of an event, such as an arrival message, an appointment, a proximity notification, or the like, in such a manner so as not to disturb a user. The location manager 350 may manage the location information of the electronic device. The graphic manager 351 may manage a graphic effect to be provided to a user and a user interface relating to the graphic effect. The security manager 352 may provide various security functions required for system security, user authentication, or the like. According to an embodiment of the present disclosure, in a case where the electronic device (e.g., the electronic device 101) has a telephone call function, the middleware 330 may further include a telephony manager for managing a voice or video call function of the electronic device.

The middleware 330 may include a middleware module that forms a combination of various functions of the above-described elements. The middleware 330 may provide a specialized module for each type of operating system in order to provide a differentiated function. Furthermore, the middleware 330 may dynamically remove some of the existing elements, or may add new elements.

The API 360 (e.g., the API 145) is, for example, a set of API programming functions, and may be provided with a different configuration for each operating system. For example, in the case of Android or iOS, one API set may be provided for each platform, and in the case of Tizen, two or more API sets may be provided for each platform.

The applications 370 (e.g., the application programs 147) may include one or more applications that may perform functions, for example, home 371, dialer 372, SMS/MMS 373, instant message (IM) 374, browser 375, camera 376, alarm 377, contacts 378, voice dial 379, e-mail 380, calendar 381, media player 382, album 383, clock 384, health care (e.g., measuring exercise quantity or blood sugar), and environment information (e.g., providing atmospheric pressure, humidity, temperature information, or the like.).

According to an embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for forwarding predetermined information to the external electronic device or a device management application for managing the external electronic device.

For example, the notification relay application may include a function of transferring, to the external electronic device (e.g., the electronic device 102 or 104), notification information that is generated from the other applications (e.g., the SMS/MMS application, the e-mail application, the health care application, the environmental information application, or the like) of the electronic device. Furthermore, the notification relay application, for example, may receive notification information from the external electronic device and may provide the received notification information to a user.

The device management application may manage (e.g., install, delete, or update), for example, at least one function of an external electronic device (e.g., the electronic device 102 or 104) that communicates with the electronic device (e.g., a function of turning on/off the external electronic device itself (or some components thereof) or a function of adjusting the brightness (or resolution) of a display), applications that operate in the external electronic device, or services (e.g., a call service, a message service, or the like) that are provided by the external electronic device.

According to an embodiment of the present disclosure, the applications 370 may include applications (e.g., a health care application of a mobile medical appliance or the like) that are designated according to attributes of an external electronic device (e.g., the electronic device 102 or 104). According to an embodiment of the present disclosure, the applications 370 may include applications that are received from an external electronic device (e.g., the server 106, or the electronic device 102 or 104). According to an embodiment of the present disclosure, the applications 370 may include preloaded applications or third-party applications that may be downloaded from a server. The names of the elements of the program module 310, according to the above-described embodiments of the present disclosure, may change depending on a type of operating system.

According to various embodiments of the present disclosure, at least some of the program module 310 may be embodied by using software, firmware, hardware, or a combination of two or more thereof. At least a part of the program module 310 may be implemented (e.g., executed) by, for example, a processor (e.g., the processor 210). At least some of the program module 310 may include, for example, a module, a program, a routine, a set of instructions, or a process for performing one or more functions.

Figure 4A:
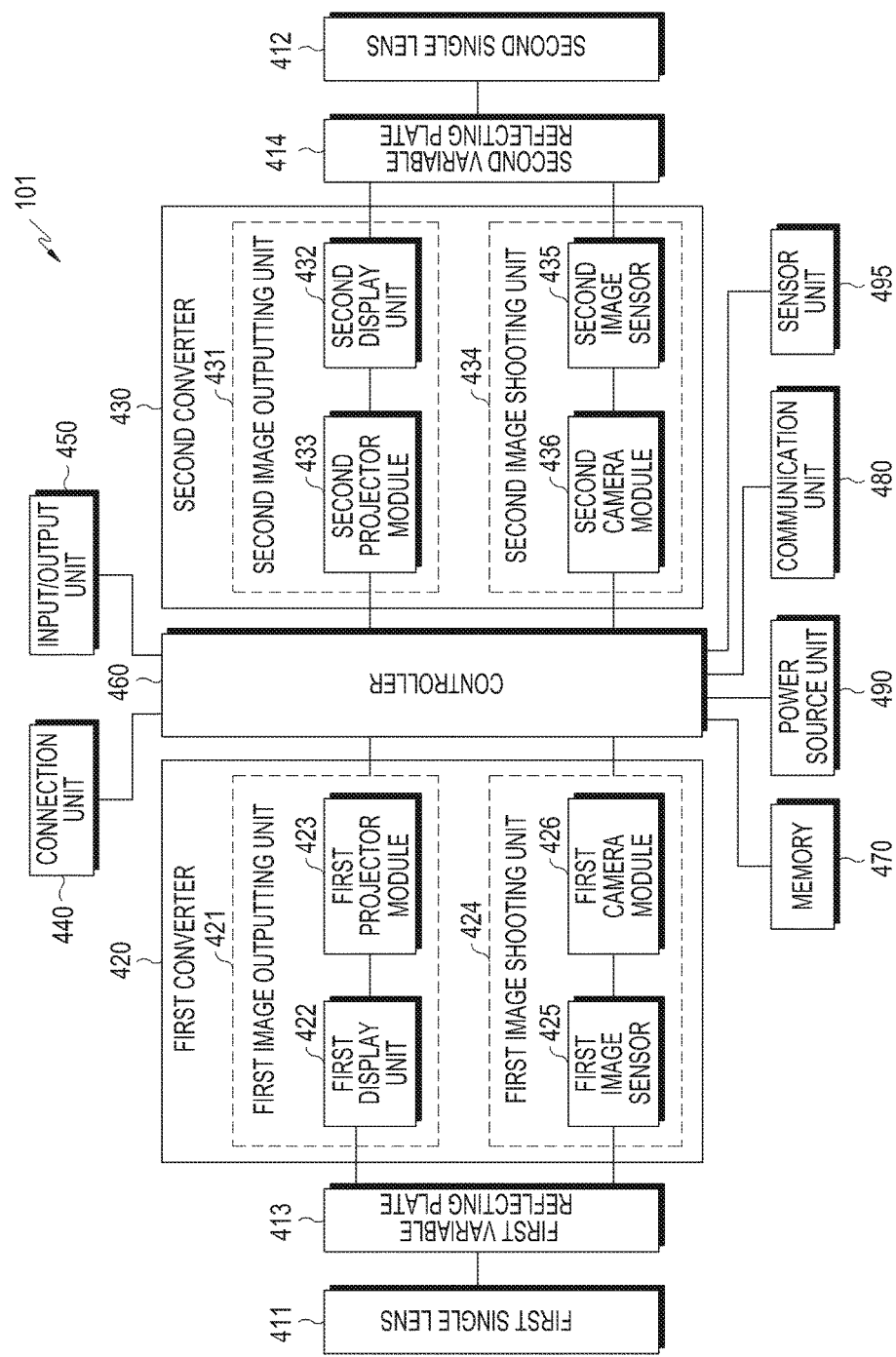
FIG. 4A illustrates a block diagram of an electronic device that controls image shooting and image outputting according to an embodiment of the present disclosure.
Figure 4B:
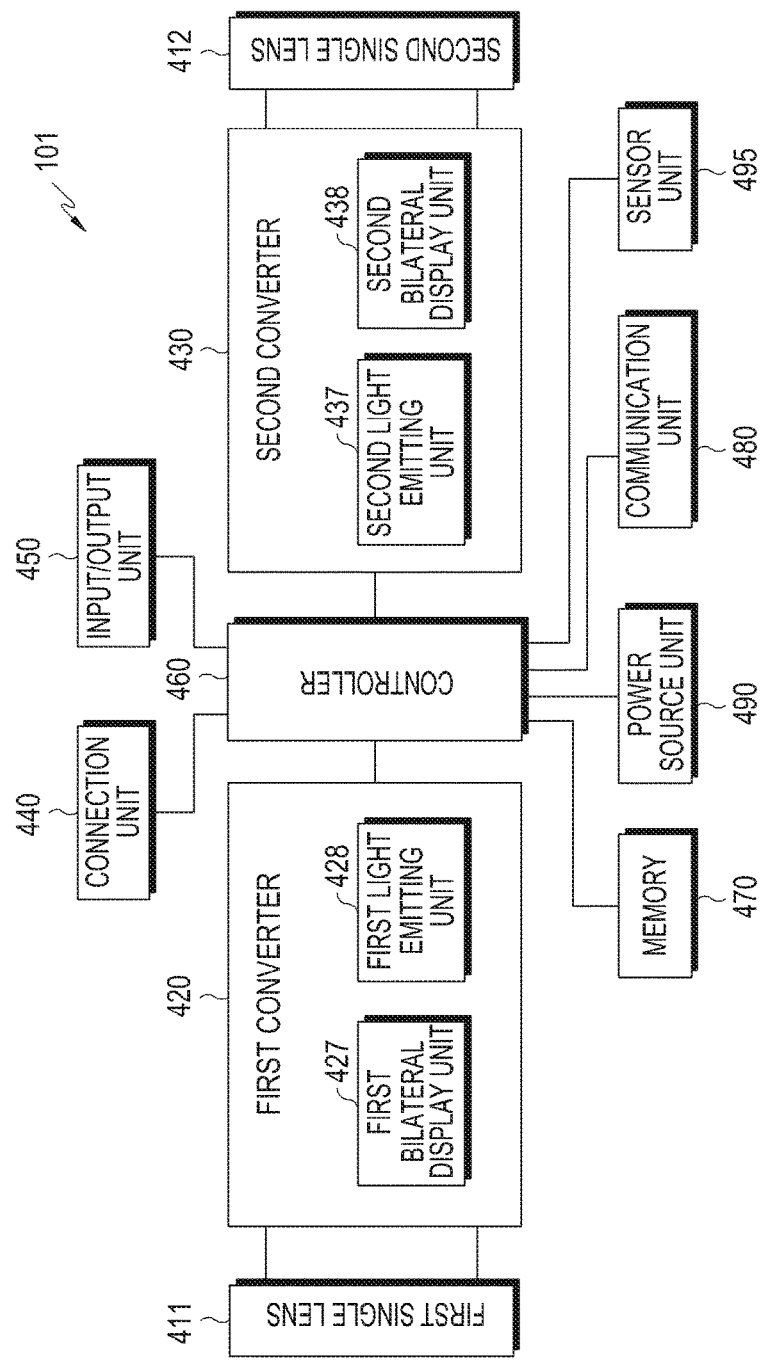
FIG. 4B illustrates a block diagram of an electronic device that controls image shooting and image outputting according to another embodiment of the present disclosure.

FIG. 4A illustrates a block diagram of an electronic device that controls image shooting and image outputting according to an embodiment of the present disclosure, and FIG. 4B illustrates a block diagram of an electronic device that controls image shooting and image outputting according to another embodiment of the present disclosure.

The electronic device 101 according to an embodiment of the present disclosure may be, for example, a mobile terminal that is capable of transmitting and receiving data, and may be equipped with at least one camera. The electronic device 101 may be mounted to an external device, may be connected to or may access the external device wirelessly or wiredly, and may be in a spherical shape. The external device may include: a cradle that docks the electronic device 101; an external cover that is connected or installed to the electronic device 101, and is formed of micro suctions to absorb impact applied to the electronic device 101 or to stick to a plane; a hologram cover that encloses the electronic device 101; a waterproofing cover; and a flight vehicle for flying the electronic device 101. Alternatively, the external device may include a smart phone, a tablet personal computer (PC), a 3D-television (TV), a smart TV, a light emitting diode (LED) TV, a liquid crystal display (LCD) TV, a table PC, an electronic bulletin board, and the like, and may also include all devices that are capable of communicating with a peripheral device or another terminal located at a long distance.

Referring to FIG. 4A, the electronic device 101 may include, for example, a first single lens 411 and a second single lens 412, a first variable reflecting plate 413 and a second variable reflecting plate 414, a first converter 420 and a second converter 430, a connection unit 440, an input/output unit 450, a controller 460, a memory 470, a communication unit 480, a power source unit 490, and a sensor unit 495. Alternatively, the electronic device 101 may include at least one single lens 411 or 412, at least one variable reflecting plate 413 or 414, at least one converter 420 or 430, the connection unit 440, the input/output unit 450, the controller 460, the memory 470, the communication unit 480, the power source unit 490, and the sensor unit 495. The electronic device 101, for example, may be in a spherical shape, and includes a plurality of lenses that are capable of shooting and outputting an image of 360 degrees. The electronic device 101 may further include, for example, a variable reflecting plate and a converter, which correspond to each lens.

According to various embodiments of the present disclosure, the first single lens 411 and the second single lens 412 may be included in a lens unit. The first single lens 411 and the second single lens 412 may be capable of shooting an image or may be capable of forming the image of an object. When an image is shot or output, a lens focus and/or characteristic may be changed. Also, the first single lens 411 and the second single lens 412 may include a variable focal lens. Each of the first single lens 411 and the second single lens 412 may include a wide lens having at least an angle of view of 180 degrees.

According to various embodiments of the present disclosure, the first variable reflecting plate 413 and the second variable reflecting plate 414 may respectively reflect images that are respectively formed by the first single lens 411 and the second single lens 412, and may transfer the same to the first converter 420 and the second converter 430, respectively. For example, when the electronic device 101 shoots an image, the first variable reflecting plate 413 and the second variable reflecting plate 414 may respectively transfer images, which are respectively formed by the first single lens 411 and the second single lens 412, respectively to a first image sensor 425 of a first image shooting unit 424 and a second image sensor 435 of a second image shooting unit 434. Each of the first variable reflecting plate 413 and the second variable reflecting plate 414 may adjust an angle of reflection, so that images that are respectively formed by the first single lens 411 and the second single lens 412 are respectively transferred to the first image sensor 425 of the first image shooting unit 424 and the second image sensor 435 of the second image shooting unit 434. When the electronic device 101 shoots an image, the first variable reflecting plate 413 and the second variable reflecting plate 414 may enable images, which are respectively output from a first projector module 423 and a second projector module 433, to be output through the first single lens 411 and the second single lens 412, respectively. The first variable reflecting plate 413 and the second variable reflecting plate 414 may enable images, which are respectively output from the first projector module 423 and the second projector module 433 and respectively pass through a first display unit 422 and a second display unit 432, to be output through the first single lens 411 and the second single lens 412, respectively. Each of the first variable reflecting plate 413 and the second variable reflecting plate 414 may adjust an angle of reflection so that images, which are respectively output from the first projector module 423 and the second projector module 433 and respectively pass through the first display unit 422 and the second display unit 432, may be output through the first single lens 411 and the second single lens 412, respectively.

According to various embodiments of the present disclosure, the first converter 420 may include: a first image outputting unit 421 that outputs an image stored in the memory 470 of the electronic device 101 or outputs an image received through the communication unit 480; and a first image shooting unit 424 that shoots an image or a video. The first converter 420 may include the first projector module 423 that outputs an image, and the first display unit 422 that displays an output image. The first image shooting unit 424 may include: the first image sensor 425 that senses an image that flows from the first variable reflecting plate 413; and a first camera module 426 that processes the sensed image. In the same manner, the second converter 430 may include: a second image outputting unit 431 that outputs an image stored in the memory 470 of the electronic device 101 or outputs an image received through the communication unit 480; and the second image shooting unit 434 that shoots an image or a video. The second converter 430 may include the second projector module 433 that outputs an image, and the second display unit 432 that displays an output image. The second image shooting unit 434 may include: a second image sensor 435 that senses an image that flows from the second variable reflecting plate 414; and a second camera module 436 that processes the sensed image.

According to various embodiments of the present disclosure, the first converter 420 and the second converter 430 may be referred to as a converter. At least one of the first converter 420 and the second converter 430 may be activated or deactivated based on whether an image is shot or whether an image is output. At least one of the first converter 420 and the second converter 430 may shoot an image or output an image under the control of the controller 460. Alternatively, at least one of the first converter 420 and the second converter 430 may simultaneously perform image shooting and image outputting under the control of the controller 460.

According to various embodiments of the present disclosure, at least one of the first converter 420 and the second converter 430 may switch (convert) the mode of the electronic device 101 into an image shooting or an image outputting, under the control of the controller 460. At least one of the first converter 420 and the second converter 430 may include: an image outputting unit that is formed of a display unit and a projector module; and an image shooting unit that is formed of an image sensor and a camera module. At least one of the first converter 420 and the second converter 430 may include: a bilateral display unit that senses or displays an image when the electronic device operates in the image shooting; and a light emitting unit that outputs an image when the electronic device operates in the image outputting.

According to various embodiments of the present disclosure, the connection unit 440 may perform at least one function or operation performed in the input/output interface 150 of FIG. 1. The connection unit 440 may be connected to, for example, a cradle that docks the electronic device 101; an external cover that is connected or installed to the electronic device, and is formed of micro suctions to absorb impact applied to the electronic device or to stick to a plane; a hologram cover that encloses the electronic device; a waterproofing cover; and a flight vehicle for flying the electronic device. The connection unit 440 may be used as an interface for connecting the electronic device 101 and an external device (not illustrated) or a power source (not illustrated). The electronic device 101 may transmit an image stored in the memory 470 of the electronic device 101 to an external device (not illustrated), or may receive data from an external device (not illustrated) through a wired cable that is connected to the connection unit 440 under the control of the controller 460. Also, the electronic device 101 may receive power from a power source (not illustrated) or may charge a batter (not illustrated) using the power source through a wired cable connected to the connection unit 440.

According to various embodiments of the present disclosure, the input/output unit 450 may perform at least one function or operation performed in the input/output interface 150 of FIG. 1. The input/output unit 450, for example, may be included in the exterior of the electronic device 101, and may include at least one of a plurality of buttons (not illustrated), a microphone (not illustrated), a speaker (not illustrated), a vibration motor (not illustrated), an earphone connecting jack (not illustrated), and a sensor (not illustrated). The input/output unit 450 is not limited thereto, and a cursor control, such as a mouse, a trackball, a joystick, or cursor direction keys may be provided to control communication with the controller 460. A button (not illustrated) may be formed in the front side, a lateral side, or the back side of the housing of the electronic device 101, and may include at least one of a power/lock button (not illustrated), a volume button (not illustrated), and a menu button. A microphone (not illustrated) receives a voice or a sound to generate an electrical signal under the control of the controller 460. A speaker (not illustrated) may output various sounds corresponding to various signals (e.g., a wireless signal, a broadcasting signal, a digital audio file, a digital video file, or a photographing signal, and the like) under the control of the controller 460. The speaker (not illustrated) may output a sound (e.g., a button tone corresponding to phone call, or a ringing tone) corresponding to a function performed by the electronic device 101. A vibration motor (not illustrated) may convert an electrical signal into mechanical vibration under the control of the controller 460. An earphone (not illustrated) is connected to the electronic device 101 by being inserted into an earphone connecting jack (not illustrated).

According to various embodiments of the present disclosure, the memory 470 may perform at least one function or operation performed in the memory 130 of FIG. 1. The memory 470, for example, may store a signal or data input/output in association with operations of the connection unit 440, the input/output unit 450, the memory 470, and the communication unit 480, under the control of the controller 460. The memory 470 may store a control program and applications for controlling the electronic device 101 or the controller 460. The memory 470 may include a memory card (not illustrated) (e.g., an SD card and a memory stick) contained in the electronic device 101. A storage unit may include a nonvolatile memory, a volatile memory, a hard disk drive (HDD), or a solid state drive (SSD).

According to various embodiments of the present disclosure, the communication unit 480 may perform at least one function or operation performed in the communication module 170 of FIG. 1. The communication unit 480 may include, for example, a mobile communication module (not illustrated) and a sub-communication module (not illustrated) that performs short-range communication with a wireless LAN. The communication unit 480 may perform communication with an external device using at least one antenna (not illustrated) under the control of the controller 460. The communication unit 480 may transmit/receive a wireless signal for a voice call, a video call, a short message service (SMS), or a multimedia message service (MMS) to/from a portable phone (not illustrated), a smart phone (not illustrated), a tablet PC, or another device (not illustrated), which has a phone number that is input into the electronic device 101. The communication unit 480 may include at least one of a wireless LAN module (not illustrated) and a short-range communication module (not illustrated), and may perform communication with an external device through the same.

According to various embodiments of the present disclosure, the power source unit 490 may supply power to one or a plurality of batteries (not illustrated) disposed in the housing of the electronic device 101 under the control of the controller 460. The one or the plurality of batteries (not illustrated) supply electrical power to the electronic device 101. Further, the power source unit 490 may supply the electronic device 101 with power input from an external power source (not shown) through a wired cable connected to the connection unit 440. In addition, the power source unit 490 may supply the electronic device 101 with power that is wirelessly input from the external power source by using a wireless charging technology.

According to various embodiments of the present disclosure, the sensor unit 495 may include at least one sensor that detects the state of the electronic device 101. The sensor unit 495 may sense at least one of a shake of the electronic device 101 and a pressure applied on the electronic device 101. The controller 460 may control one of: turning on/off the electronic device 101, turning on/off the image shooting, and turning on/off the image outputting, based on the sensing. Alternatively, the sensor unit 495 may include a proximity sensor for detecting whether a user approaches the electronic device 101, an illuminance sensor (not illustrated) for detecting an amount of ambient light of the electronic device 101, a motion sensor (not illustrated) for detecting an operation (e.g., a rotation of the electronic device 101, or an acceleration or a vibration applied to the electronic device 101) of the electronic device 101, a geo-magnetic sensor (not illustrated) for detecting a point of the compass by using the Earth's magnetic field, a gravity sensor for detecting an action direction of the gravity, and an altimeter for measuring an atmospheric pressure to detect an altitude. At least one of the sensors may detect the state, generate a signal corresponding to the detection, and transmit the generated signal to the controller 460. Each sensor of the sensor unit 495 may be added or deleted according to the capability of the electronic device 101.

According to various embodiments of the present disclosure, the controller 460 may perform at least one function or operation performed in the processor 120 of FIG. 1. The controller 460 may control, for example, at least one of the first single lens 411 and the second single lens 412, the first variable reflecting plate 413 and the second variable reflecting plate 414, the first converter 420 and the second converter 430, the connection unit 440, the input/output unit 450, the controller 460, the memory 470, the communication unit 480, the power source unit 490, and the sensor unit 495.

According to various embodiments of the present disclosure, the controller 460 may determine image shooting or image outputting, and may control a function associated with at least one determined mode out of image shooting and image outputting to be performed through a single lens contained in the lens unit. The controller 460 may sense an external device that is connected to the electronic device 101, and may determine at least one of image shooting and image outputting based on a type of the external device. The controller 460 may perform a function associated with the determined image shooting through the first single lens 411 contained in the electronic device 101, and may perform a function associated with the determined image outputting through the second single lens 412 contained in the electronic device 101. The controller 460 may simultaneously perform a function associated with the determined image shooting through the first single lens 411 and the second single lens 412 contained in the electronic device 101. The controller 460 may simultaneously perform a function associated with the determined image outputting through the first single lens 411 and the second single lens 412 contained in the electronic device 101. The controller 460 may determine the number of frames shot for each second in association with the image shooting based on the movement speed of the electronic device 101 sensed by the sensor unit 495, and may shoot an image based on the determined number of frames shot for each second. The controller 460 may control one of turning on/off the electronic device, turning on/off the image shooting, and turning on/off image outputting based on at least one of a shake of the electronic device 101 and a pressure applied on the electronic device, which are sensed by the sensor unit 495.

Referring to FIG. 4B, the electronic device 101 may include, for example, the first single lens 411 and the second single lens 412, the first converter 420 and the second converter 430, the connection unit 440, the input/output unit 450, the controller 460, the memory 470, the communication unit 480, the power source unit 490, and the sensor unit 495. Alternatively, the electronic device 101 may include at least one single lens 411 or 412, at least one converter 420 or 430, the connection unit 440, the input/output unit 450, the controller 460, the memory 470, the communication unit 480, the power source unit 490, and the sensor unit 495. At least one function or at least one operation associated with each of the first single lens 411 and the second single lens 412, the connection unit 440, the input/output unit 450, the memory 470, the communication unit 480, the power source unit 490, and the sensor unit 495 in FIG. 4B has been provided through the descriptions with reference to FIG. 4A, and thus, detailed descriptions thereof will be omitted.

According to various embodiments of the present disclosure, the first converter 420 may include: a first bilateral display unit 427 that outputs an image stored in the memory 470 of the electronic device 101 or outputs an image received through the communication unit 480, or senses the image of an object formed on the first single lens 411; and a first light emitting unit 428 that emits light by operating as an image outputting when an image is output. The first bilateral display unit 427 may perform an image sensor function that senses the image of an object, or may perform a display function that outputs an image. The first bilateral display unit 427 may include a bilateral OLED display unit. In the same manner, the second converter 430 may include: a second bilateral display unit 438 that outputs an image stored in the memory 470 of the electronic device 101 or outputs an image received through the communication unit 480, or senses the image of an object formed on the second single lens 412; and a second light emitting unit 437 that emits light by operating as an image outputting when an image is output. The second bilateral display unit 437 may perform an image sensor function that senses the image of an object, or may perform a display function that outputs an image. The second bilateral display unit 438 may include a bilateral OLED display unit.

According to various embodiments of the present disclosure, the first converter 420 and the second converter 430 may be referred to as a converter. The first bilateral display unit 427 and the first light emitting unit 428 formed in the first converter 420 may be activated or deactivated based on whether an image is shot or output. Alternatively, the second bilateral display unit 438 and the second light emitting unit 437 formed in the second converter 430 may be activated or deactivated based on whether an image is shot or output. At least one of the first converter 420 and the second converter 430 may shoot an image or output an image under the control of the controller 460. Alternatively, at least one of the first converter 420 and the second converter 430 may simultaneously perform image shooting and image outputting under the control of the controller 460.

According to various embodiments of the present disclosure, at least one of the first converter 420 and the second converter 430 may include: a bilateral display unit that senses or displays an image when the electronic device operates in the image shooting mode; and a light emitting unit that outputs an image when the electronic device operates in the image outputting mode. At least one of the first converter 420 and the second converter 430 may switch (convert), under the control of the controller 460, the mode of the electronic device 101 into an image shooting mode or an image outputting mode.

Figure 5A:
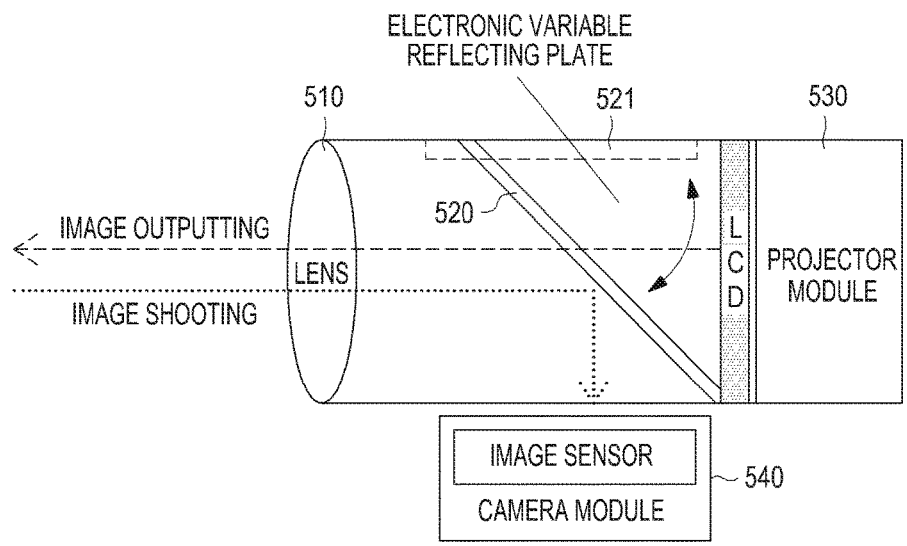
FIG. 5A illustrates a detailed diagram of an electronic device that controls image shooting and image outputting according to an embodiment of the present disclosure.
Figure 5B:
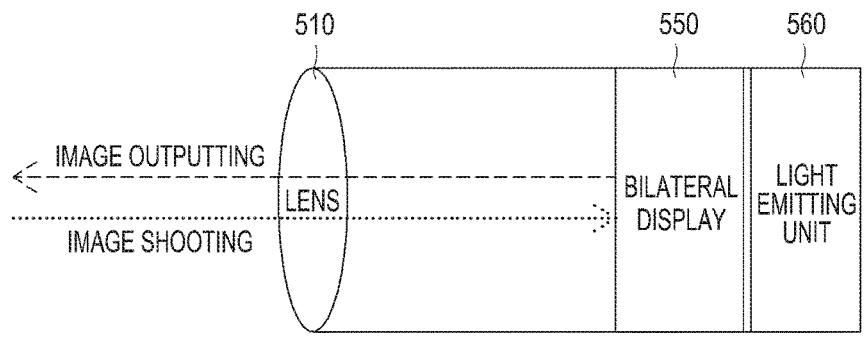
FIG. 5B illustrates a detailed diagram of an electronic device that controls image shooting and image outputting according to another embodiment of the present disclosure.

FIG. 5A illustrates a detailed diagram of an electronic device that controls image shooting and image outputting according to an embodiment of the present disclosure, and FIG. 5B illustrates a detailed diagram of an electronic device that controls image shooting and image outputting according to another embodiment of the present disclosure.

Referring to FIG. 5A, the electronic device 101 may include a single lens 510, a variable reflecting plate 520, a display unit 521, a projector module 530, and a camera module 540.

According to various embodiments of the present disclosure, the single lens 510 may have an angle of view of 180 degrees, and may shoot an image or output, to the outside, an image that is output from the projector module 530. Alternatively, the single lens 510 may include a variable focal lens. The single lens 510 may include a wide lens having an angle of view of at least 180 degrees. The single lens 510 may be capable of shooting an image or may be capable of forming the image of an object. When an image is shot or output, a lens focus and/or characteristic may be changed.

According to various embodiments of the present disclosure, the variable reflecting plate 520 may reflect the image that is formed on the single lens 510, and may transmit the same to the camera module 540. For example, when the electronic device 101 shoots an image, the variable reflecting plate 520 may adjust an angle of reflection to enable the image formed on the single lens 510 to be transmitted to the camera module 540. For example, when the electronic device 101 outputs an image, the variable reflecting plate 520 may enable the image that is output from the projector module 530 to be output through the single lens 510. The variable reflecting plate 520 may adjust an angle of reflection to enable the image that is output from the projector module 530 to be output through the single lens 510.

According to various embodiments of the present disclosure, the projector module 530 may be activated when an image is output, and may output the image to the outside through the single lens 510. In this instance, the variable reflecting plate 520 may adjust an angle of reflection to output the image. For example, when an image is output, the variable reflecting plate 520 may move to not have any effect on the output image (e.g., from the location of the variable reflecting plate 520 to the location of the display unit 521). When an image is shot, the camera module 540 may be activated and may receive an image from the outside through the single lens 510. In this instance, the variable reflecting plate 520 may adjust an angle of reflection to enable the image to be recognized by an image sensor contained in the camera module 540. For example, when an image is shot, the variable reflecting plate 520 may move to enable the shot image to flow into the image sensor (e.g., from the location of display unit 521 to the location of the variable reflecting plate 520).

Referring to FIG. 5B, the electronic device 101 may include the single lens 510, a bilateral display 550, and a light emitting unit 560.

According to various embodiments of the present disclosure, the single lens 510 may have an angle of view of 180 degrees, and may shoot an image or output, to the outside, an image that is output from the projector module 530. Alternatively, the single lens 510 may include a variable focal lens. The single lens 510 may include a wide lens having an angle of view of at least 180 degrees. The single lens 510 may be capable of shooting an image or may be capable of forming an image. When an image is shot or output, a lens focus and/or characteristic may be changed.

According to various embodiments of the present disclosure, the bilateral display 550 may perform an image sensor function that senses the image of an object, or may perform a display function that outputs an image. The bilateral display 550 may be activated or deactivated based on whether an image is shot or an image is output. The bilateral display 550 may sense or output an image under the control of the controller 460. Alternatively, the bilateral display 550 may simultaneously perform image sensing and image outputting under the control of the controller 460.

According to various embodiments of the present disclosure, the light emitting unit 560 may include a plurality of light emitting devices for outputting an image. The light emitting unit 560 may functionally interwork with the bilateral display 550, and may output an image or may sense an image that flows from the single lens 510. The light emitting unit 560 may be activated or deactivated based on whether an image is shot or an image is output. The light emitting unit 560 may sense or output an image under the control of the controller 460. Alternatively, the light emitting unit 560 may simultaneously perform image sensing and image outputting under the control of the controller 460.

Figure 6:
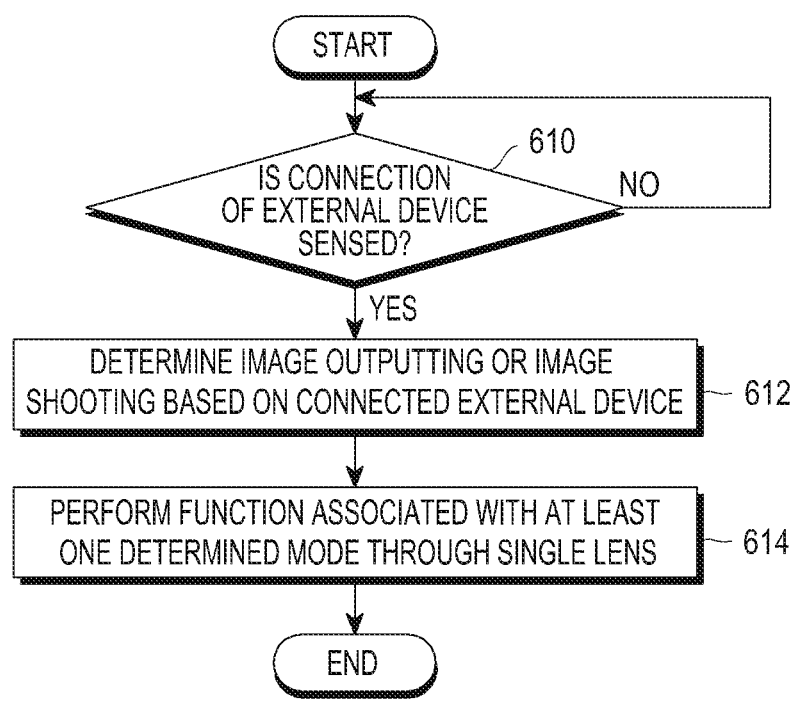
FIG. 6 illustrates a flowchart of a process in which an electronic device controls image shooting and image outputting according to an embodiment of the present disclosure.

FIG. 6 illustrates a flowchart of a process in which an electronic device controls image shooting and image outputting according to an embodiment of the present disclosure.

Hereinafter, referring to FIG. 6, a process in which an electronic device controls image shooting and image outputting, according to an embodiment of the present disclosure, will be described as follows.

According to various embodiments of the present disclosure, when the connection of an external device is sensed in operation 610, the electronic device 101 determines image outputting or image shooting based on the connected external device in operation 612. The electronic device 101 may sense the connection of the external device. The electronic device 101 may sense the connection with an external device, for example: a cradle that docks the electronic device 101; an external cover that is connected or installed to the electronic device 101, and is formed of micro suctions to absorb impact applied to the electronic device 101 or to stick to a plane; a hologram cover that encloses the electronic device; a waterproofing cover; and a flight vehicle for flying the electronic device. When the connection with the flight vehicle is sensed, the electronic device 101 may be switched to a flight vehicle control and flight shooting mode. When it is connected to the cradle, the electronic device 101 may be switched into a shooting mode, such as a CCTV, or may be switched into an outputting mode, such as a projector. Also, when it is connected to a hologram and/or projection cover, the electronic device 101 may be switched into a hologram outputting and/or projection outputting mode, and may adjust a focus to enable an image to be formed on the surface of the cover. The electronic device 101, according to an embodiment of the present disclosure, may sense the access or connection of various external devices that may have an effect on shooting or outputting an image, in addition to the above described external devices. Based on a type of electronic device that is connected, the electronic device 101 may determine at least one of image shooting and image outputting.

According to various embodiments of the present disclosure, the electronic device 101 may include at least one single lens, at least one image outputting unit, at least one image shooting unit, and at least one variable reflecting plate. Each of a single lens, an image outputting unit, an image shooting unit, and a variable reflecting plate may be packaged. For example, when image shooting is determined, the electronic device 101 may activate at least one image shooting unit, and may deactivate at least one image outputting unit. For example, when image outputting is determined, the electronic device 101 may deactivate at least one image shooting unit, and may activate at least one image outputting unit.

According to various embodiments of the present disclosure, when a plurality of image outputting units and a plurality of image shooting units are contained in the electronic device 101, the electronic device 101 may output an image through one or more image outputting units out of the plurality of image outputting units, and may shoot an image through one or more image shooting units out of the plurality of image shooting units. Alternatively, the electronic device 101 may include at least one single lens, at least one bilateral display unit, and at least one light emitting unit. Each of a single lens, a bilateral display unit, and a light emitting unit may be packaged. For example, when image shooting is determined, the electronic device 101 may activate at least one bilateral display unit, and may deactivate at least one light emitting unit. For example, when image outputting is determined, the electronic device 101 may deactivate at least one bilateral display unit, and may activate at least one light emitting unit. For example, when a plurality of bilateral display units and a plurality of light emitting units are contained in the electronic device 101, the electronic device 101 may shoot an image through one or more bilateral display units out of the plurality of bilateral display units, and may shoot an image through one or more out of the plurality of light emitting units.

According to various embodiments of the present disclosure, the electronic device 101 performs a function associated with at least one determined mode through a single lens in operation 614. For example, when image shooting and image outputting are determined, the electronic device 101 may perform a function associated with image shooting through a first single lens contained in the electronic device 101, and may perform a function associated with image outputting through a second single lens contained in the electronic device 101. Alternatively, when image shooting and image outputting are determined, the electronic device 101 may simultaneously perform a function associated with image shooting through the first single lens and the second single lens contained in the electronic device 101. Alternatively, when image shooting and image outputting are determined, the electronic device 101 may simultaneously perform a function associated with image outputting through the first single lens and the second single lens contained in the electronic device 101.

According to various embodiments of the present disclosure, the electronic device 101 may sense the movement speed of the electronic device 101, and may determine image outputting and/or image shooting based on the sensed speed. The electronic device 101 may determine the number of frames shot for each second in association with image shooting based on the sensed movement speed, and may shoot an image based on the determined number of frames shot for each second. Alternatively, the electronic device 101 may sense at least one of a shake of the electronic device 101 and a pressure applied on the electronic device 101. Based on the sensing, the electronic device 101 may control one of: turning on/off the electronic device, turning on/off the image shooting, and turning on/off the image outputting.

Figure 7:
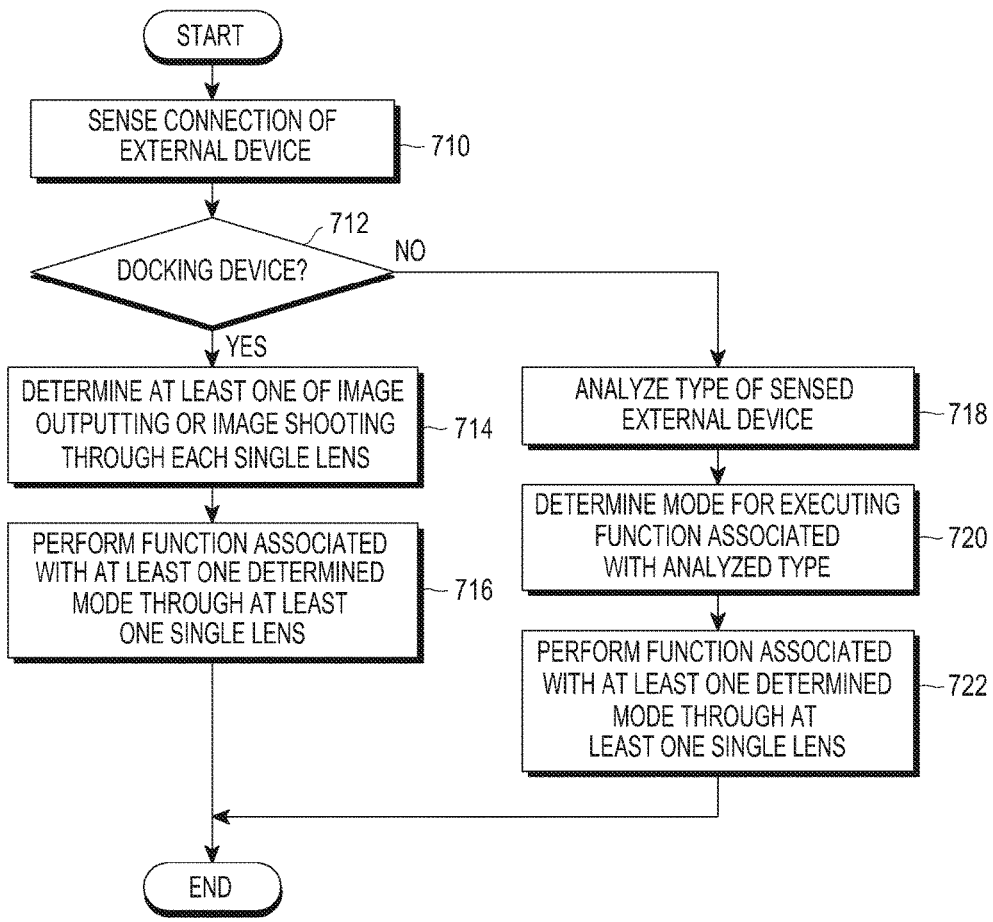
FIG. 7 illustrates a flowchart of a process in which an electronic device controls image shooting and image outputting according to another embodiment of the present disclosure.

FIG. 7 illustrates a flowchart of a process in which an electronic device controls image shooting and image outputting according to another embodiment of the present disclosure.

Hereinafter, referring to FIG. 7, a process in which an electronic device controls image shooting and image outputting according to another embodiment of the present disclosure will be described as follows.

According to various embodiments of the present disclosure, the electronic device 101 senses the connection of an external device in operation 710. The electronic device 101 may sense the connection with an external device, for example: a cradle that docks the electronic device 101; an external cover that is connected or installed to the electronic device 101, and is formed of micro suctions to absorb impact applied to the electronic device 101 or to stick to a plane; a hologram cover that encloses the electronic device; a waterproofing cover; and a flight vehicle for flying the electronic device. The electronic device 101, according to an embodiment of the present disclosure, may sense the access or connection of various external devices that may have an effect on shooting or outputting an image, in addition to the above described external devices.

According to various embodiments of the present disclosure, when docking is sensed in operation 712, the electronic device 101 determines at least one of image outputting and image shooting through each single lens in operation 714. According to various embodiments of the present disclosure, the electronic device 101 may determine at least one of image shooting and image outputting based on a type of electronic device connected. For example, when an external device that docks the electronic device 101 is a cradle, the electronic device 101 may determine that image shooting is performed or image outputting is performed. Alternatively, when an external cover that is formed of micro suctions is sensed, the electronic device 101 may determine that image shooting is performed or image outputting is performed. Alternatively, when the connection of an external device, such as a hologram cover, a waterproofing cover, and a flight vehicle for flying the electronic device, is detected, the electronic device 101 may determine that image shooting is performed or image outputting is performed. For example, when the electronic device 101 is connected to the flight vehicle, the electronic device 101 may be converted into an image shooting. When image shooting is determined, the electronic device 101 may activate at least one image shooting unit, and may deactivate at least one image outputting unit. For example, when image outputting is determined, the electronic device 101 may deactivate at least one image shooting unit, and may activate at least one image outputting unit.

According to various embodiments of the present disclosure, the electronic device 101 performs a function of at least one determined mode out of image outputting and image shooting through at least one single lens in operation 716. For example, image shooting and image outputting are determined, the electronic device 101 may perform a function associated with image shooting through a first single lens contained in the electronic device 101, and may perform a function associated with image outputting through a second single lens contained in the electronic device 101. Alternatively, when image shooting and image outputting are determined, the electronic device 101 may perform a function associated with image shooting simultaneously through the first single lens and the second single lens contained in the electronic device 101. Alternatively, when image shooting and image outputting are determined, the electronic device 101 may perform a function associated with image outputting simultaneously through the first single lens and the second single lens contained in the electronic device 101.

According to various embodiments of the present disclosure, when the external device sensed by the electronic device 101 in operation 712 is different from a cradle, the electronic device 101 analyzes the type of sensed external device in operation 718. The electronic device 101 may analyze whether the connected external device is: a cradle that docks the electronic device 101; an external cover that is connected or installed to the electronic device 101, and is formed of micro suctions to absorb impact applied to the electronic device 101 or to stick to a plane; a hologram cover that encloses the electronic device 101; a waterproofing cover; or a flight vehicle for flying the electronic device 101.

According to various embodiments of the present disclosure, the electronic device 101 determines a mode for executing a function based on the analyzed type of external device, and may perform the function associated with the at least one determined mode through at least one single lens in operation 722. According to various embodiments of the present disclosure, when an external device that docks the electronic device 101 is a cradle, the electronic device 101 may determine that image shooting is performed or image outputting is performed. Alternatively, when an external cover that is formed of micro suctions is sensed, the electronic device 101 may determine that image outputting is performed. Alternatively, when the connection with an external device, such as a hologram cover and a waterproofing cover, is sensed, the electronic device 101 determines that image outputting is performed. For example, when the electronic device 101 is connected to the flight vehicle, the electronic device 101 may be converted into an image shooting. For example, when image shooting is determined, the electronic device 101 may activate at least one image shooting unit, and may deactivate at least one image outputting unit. For example, when image outputting is determined, the electronic device 101 may deactivate at least one image shooting unit, and may activate at least one image outputting unit. When the connected external device is a flight vehicle, the electronic device 101 may control a flight function of the flight vehicle through transmission/reception performed with the flight vehicle.

Figure 8A:
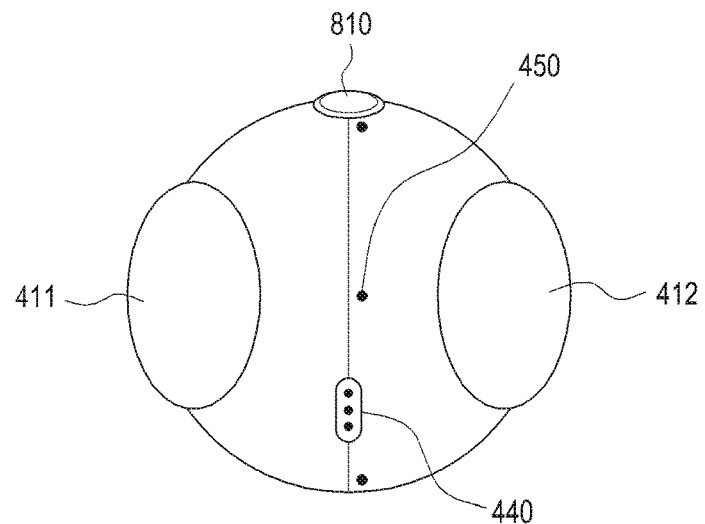
FIG. 8A illustrates the outside of an electronic device according to an embodiment of the present disclosure.
Figure 8B:
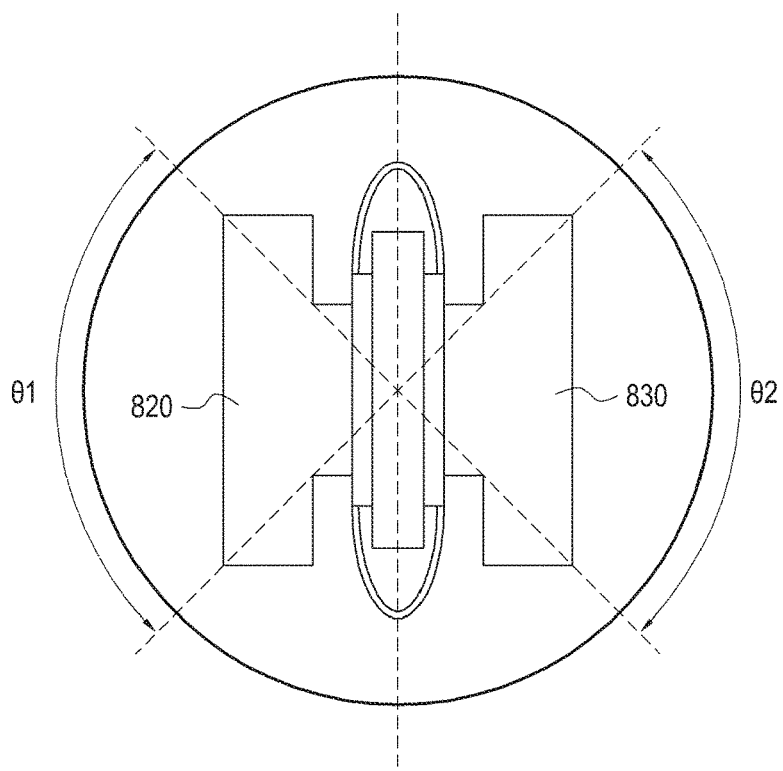
FIG. 8B illustrates the inside of an electronic device according to an embodiment of the present disclosure.

FIG. 8A illustrates the outside of an electronic device according to an embodiment of the present disclosure. FIG. 8B illustrates the inside of an electronic device according to an embodiment of the present disclosure.

Referring to FIG. 8A, a button 810, the first single lens 411, the second single lens 412, an input/output unit 450 (e.g., a microphone), and the connection unit 440 are formed on the exterior of the electronic device 101, and the electronic device 101 may be in a spherical shape. Also, the electronic device according to an embodiment of the present disclosure may be in various shapes, such as a cube, a hexahedron, triangular pyramid, and the like, in addition to a spherical shape.

According to various embodiments of the present disclosure, the button 810 may be included in the input/output unit 450. The button 810 may operate as on/off and may generate a control signal associated with one of turning on/off an electronic device, turning on/off the image shooting, and turning on/off image outputting based on the number of times that inputting is performed, an input time, and the like, and may transfer the control signal to the controller 460.

According to various embodiments of the present disclosure, the first single lens 411 and the second single lens 412 may be capable of shooting an image or may be capable of forming the image of an object. When an image is shot or output, a lens focus and/or characteristic may be changed. Alternatively, each of the first single lens 411 and the second single lens 412 may include a variable focal lens. Each of the first single lens 411 and the second single lens 412 may include a wide lens having at least an angle of view of 180 degrees. The first single lens 411 may be formed in one side of the electronic device 101, and the second single lens 412 may be formed in the opposite side or in the opposite direction of the first unit lens. The first single lens 411 may be disposed to have an angle of view of 180 degrees, and the second single lens 412 may be disposed to have an angle of view of 180 degrees, which is different from the first unit lens.

According to various embodiments of the present disclosure, the connection unit 440 may be connected to: a cradle that docks the electronic device 101; an external cover that is connected or installed to the electronic device, and is formed of micro suctions to absorb impact applied to the electronic device or to stick to a plane; a hologram cover that encloses the electronic device; a waterproofing cover; and a flight vehicle for flying the electronic device. The electronic device 101 may transmit an image stored in the memory 470 of the electronic device 101 to an external device (not illustrated), or may receive data from an external device (not illustrated) through a wired cable that is connected to the connection unit 440 under the control of the controller 460.

Referring to FIG. 8B, an embodiment of the present disclosure may package the first image outputting unit 421 and the first image shooting unit 424 contained in the first converter 420 of FIG. 4A, as well as the first variable reflecting plate 413, as a single image outputting/shooting integrated module 820. The first single lens 411 may or may not be included in the image outputting/shooting integrated module 820. The first single lens 411 may have an angle of view of θ1. Alternatively, an embodiment of the present disclosure may package the second image outputting unit 431 and the second image shooting unit 434 contained in the second converter 430 of FIG. 4A, and the second variable reflecting plate 414, as a single image outputting/shooting integrated module 830. The second single lens 412 may or may not be included in the image outputting/shooting integrated module 830. The second single lens 412 may have an angle of view of θ2. Also, an embodiment of the present disclosure may package, as a single image outputting/shooting integrated module 820, the first bilateral display unit 427 and the first light emitting unit 428 formed in the first converter 420 of FIG. 4B. The first single lens 411 may or may not be included in the image outputting/shooting integrated module 820. Alternatively, an embodiment of the present disclosure may package, as a single image outputting/shooting integrated module 830, the second bilateral display unit 438 and the second light emitting unit 437 formed in the second converter 430 of FIG. 4B. The second single lens 412 may or may not be included in the image outputting/shooting integrated module 830.

Figure 9A:
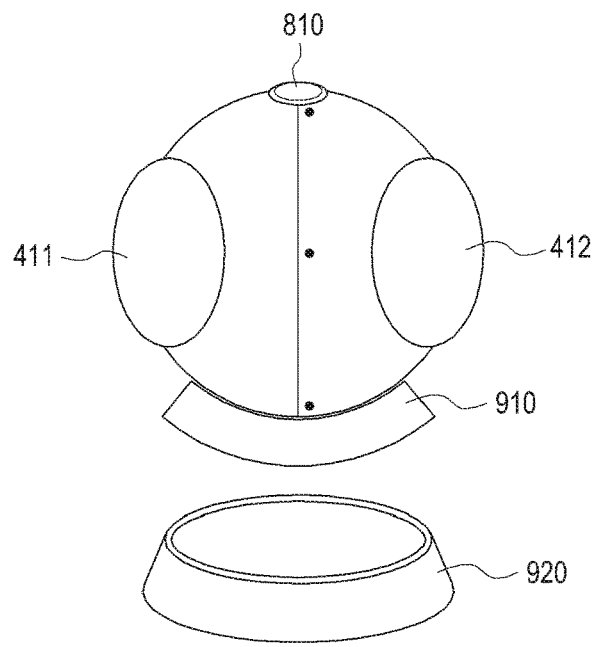
FIG. 9A illustrates an example of connecting an electronic device to a cradle according to an embodiment of the present disclosure.
Figure 9B:
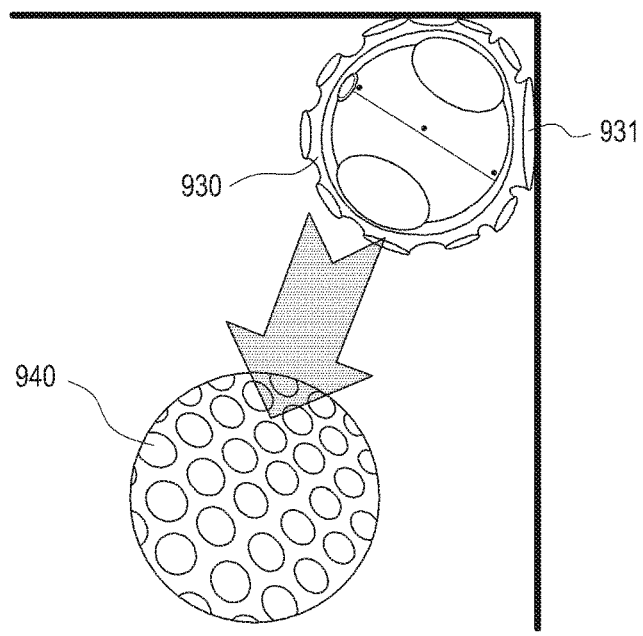
FIG. 9B illustrates an example of covering an electronic device with an external cover and attaching the same to an external wall according to an embodiment of the present disclosure.
Figure 9C:
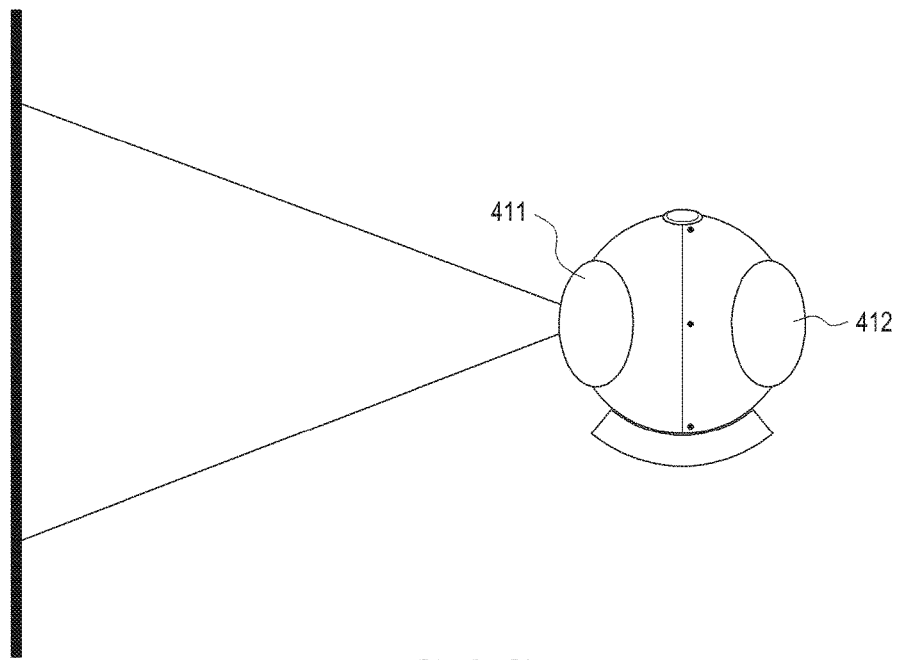
FIG. 9C illustrates an example of outputting an image through a first single lens of an electronic device according to an embodiment of the present disclosure.

FIG. 9A illustrates an example of connecting an electronic device to a cradle according to an embodiment of the present disclosure. FIG. 9B illustrates an example of covering an electronic device with an external cover and attaching the same to an external wall. FIG. 9C illustrates an example of outputting an image through the first single lens 411 of an electronic device according to an embodiment of the present disclosure.

Referring to FIG. 9A, the first single lens 411 and the second single lens 412 may be formed on the exterior of the electronic device 101, and the electronic device 101 may be in a spherical shape. Also, a single unit lens may be formed or three or more unit lenses may be formed in the electronic device 101 according to an embodiment of the present disclosure. Also, the present disclosure may further include various input/output devices, such as a microphone, a button, or the like, in the exterior of the electronic device 101.

According to various embodiments of the present disclosure, the first single lens 411 and the second single lens 412 may be capable of shooting an image or may be capable of forming the image of an object. When an image is shot or output, a lens focus and/or characteristic may be changed. Also, the first single lens 411 and the second single lens 412 may include a variable focal lens. Each of the first single lens 411 and the second single lens 412 may include a wide lens having at least an angle of view of 180 degrees. The first single lens 411 may be formed in one side of the electronic device 101, and the second single lens 412 may be formed in the opposite side or in the opposite direction of the first unit lens. The first single lens 411 may be disposed to have an angle of view of 180 degrees, and the second single lens 412 may be disposed to have an angle of view of 180 degrees, which is different from the first unit lens. According to various embodiments of the present disclosure, an image may be shot through the first single lens 411, and an image may be output through the second single lens 412. Alternatively, according to various embodiments of the present disclosure, an image may be output through the first single lens 411, and an image may be shot through the second single lens 412. Alternatively, according to various embodiments of the present disclosure, an image may be shot or an image may be output through the first single lens 411 and the second single lens 412. Image shooting or image outputting that is performed in each unit lens may be performed in parallel.

According to various embodiments of the present disclosure, a cradle 910 may hold the electronic device 101, and the shape of the cradle 910 may be in various shapes to correspond to the shape of the electronic device 101. The electronic device 101 may stably shoot an image or output an image by being connected to the cradle 910. When the cradle 910 is connected, the electronic device 101 may be switched into an image shooting or an image outputting through at least one of the first single lens 411 and the second single lens 412. The present disclosure may further include a pedestal 920 that supports the cradle 910.

Referring to FIG. 9B, the electronic device 101 may be covered with an external cover 930. The external cover 930 may be connected or installed to the electronic device 101, and may absorb impact applied to the electronic device 101. Also, a plurality of micro suctions 940 may be formed in the surface of the external cover 930, and the electronic device 101 may be attached to a surface, such as an outer wall, glass, or the like through a micro suction 931. Also, the external cover 930 may have a perforation on a part where each unit lens is located or the part may be formed of a transparent material, so that image outputting or image shooting may be performed through each unit lens 411 and 412. According to various embodiments of the present disclosure, an image may be shot or an image may be output through at least one unit lens out of a plurality of unit lenses based on the state of an electronic device that is attached to a surface.

Referring to FIG. 9C, the electronic device 101 may output an image through the first single lens 411. As described above, the first single lens 411 that outputs an image may perform the operation of a projector Also, the electronic device 101 may shoot an image or output an image through the second single lens 412. As described above, the electronic device 101 may perform image outputting through the first single lens 411 and image outputting through the second single lens 412, in parallel. Alternatively, the electronic device 101 may output an image through the first single lens 411, and may shoot an image through the second single lens 412. As described above, the electronic device 101 may perform image outputting through the first single lens 411 and may perform image shooting through the second single lens 412, in parallel. Image shooting or image outputting that is performed in each unit lens may be performed in parallel. Alternatively, the electronic device 101 may transmit a shot image to an external electronic device, or may receive image data from an external electronic device and output the same to the first single lens 411.

Figure 10A:
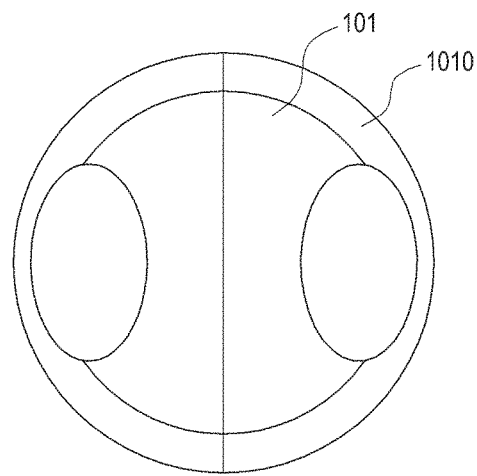
FIG. 10A illustrates an example of covering an electronic device with an external cover according to an embodiment of the present disclosure.
Figure 10B:
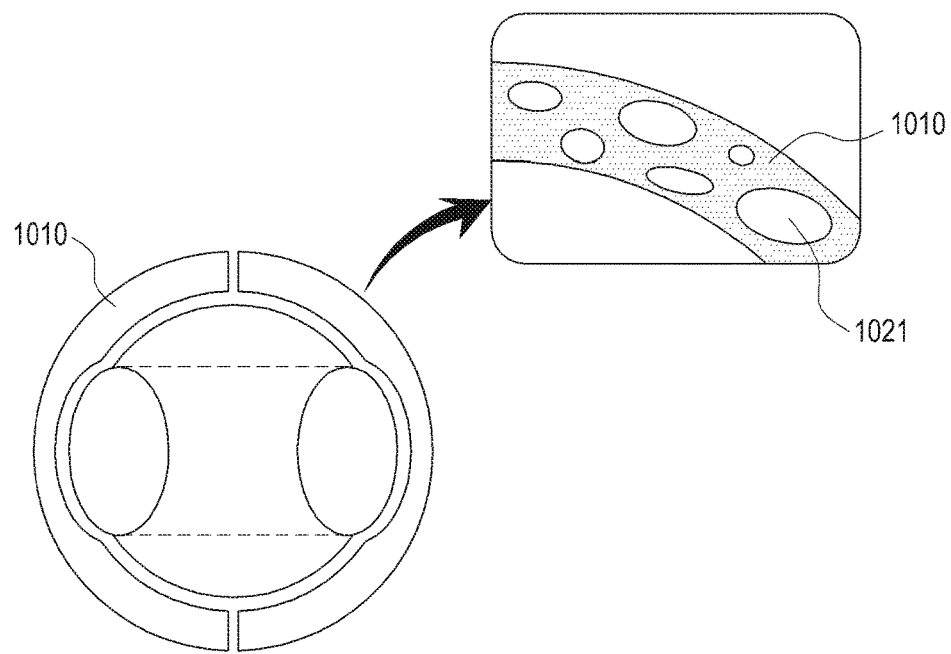
FIG. 10B illustrates an example of a sectional view of an external cover that covers an electronic device according to an embodiment of the present disclosure.

FIG. 10A illustrates an example of covering an electronic device with an external cover according to an embodiment of the present disclosure. FIG. 10B illustrates an example of a sectional view of an external cover that covers an electronic device according to an embodiment of the present disclosure.

Referring to FIG. 10A, the electronic device 101 may be covered with an external cover 1010. The external cover 1010 may be connected or installed to the electronic device 101, and may absorb impact applied to the electronic device 101. Also, the external cover 1010 may have a perforation on a part where each unit lens is located or the part may be formed of a transparent material, so that image outputting or image shooting may be performed through each unit lens. According to various embodiments of the present disclosure, an image may be shot or an image may be output through at least one unit lens out of a plurality of unit lenses, based on the state of an electronic device that is attached to a surface. The external cover 1010 may be formed of a material for displaying an image that is output from the electronic device 101. A user may view an image that is output from the electronic device 101 and is projected onto the external cover 1010. The external cover 1010 that has the function may be referred to as a hologram cover.

Referring to FIG. 10B, a plurality of air pockets 1021 for absorbing impact may be formed inside the external cover 1010 that covers the electronic device 101. Through the air pockets 1021, the electronic device 101 may relieve the impact applied to the electronic device 101. The material of the external cover may include various materials that are capable of absorbing impact, such as rubber, plastic, or the like.

Figure 11A:
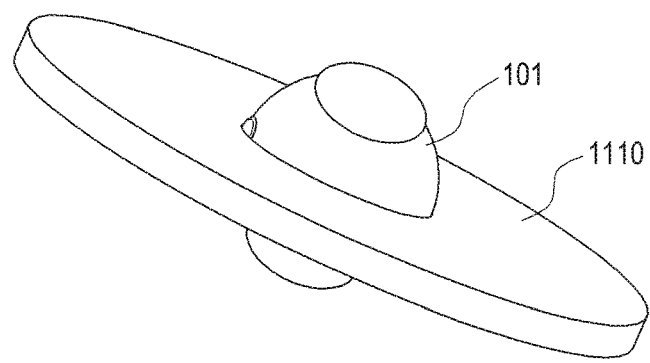
FIG. 11A illustrates an example in which an electronic device is mounted onto a flight vehicle that includes a communication function according to an embodiment of the present disclosure.
Figure 11B:
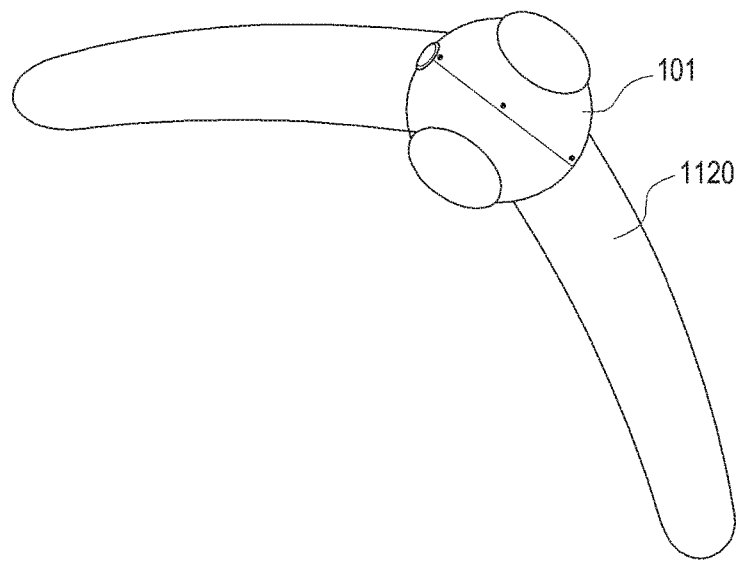
FIG. 11B illustrates an example in which an electronic device is mounted onto a flight vehicle that does not include a communication function according to an embodiment of the present disclosure.
Figure 11C:
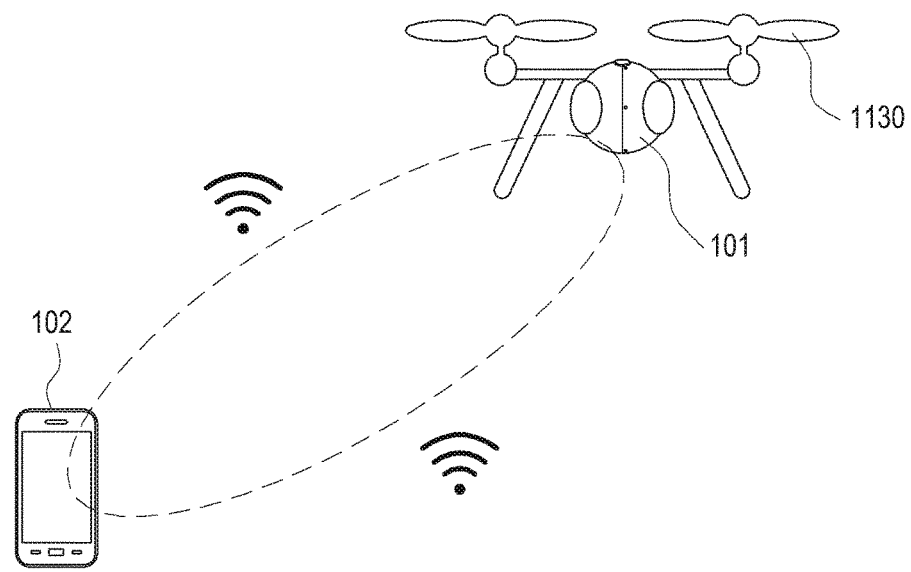
FIG. 11C illustrates an example in which an electronic device is mounted onto a drone according to an embodiment of the present disclosure.

FIG. 11A illustrates an example in which an electronic device is mounted onto a flight vehicle that includes a communication function according to an embodiment of the present disclosure. FIG. 11B illustrates an example in which an electronic device is mounted onto a flight vehicle that does not include a communication function according to an embodiment of the present disclosure. FIG. 11C illustrates an example in which an electronic device is mounted onto a drone, according to an embodiment of the present disclosure.

Referring to FIG. 11A, the electronic device 101, according to an embodiment of the present disclosure, may be mounted onto a flight vehicle 1110. The flight vehicle 1110 may include, for example, a flight vehicle that includes a communication function, and the flight thereof may be controlled by the electronic device 101. The electronic device 101 may perform communication with the flight vehicle 1110, and the electronic device 101 may transmit a control signal to the flight vehicle 1110 so that a user may remotely control the flight thereof. The electronic device 101 is mounted onto the flight vehicle 1110 and may shoot an image through at least one unit lens during flight. Alternatively, the electronic device 101 may determine the number of frames shot for each second in association with image shooting based on the speed of flight, and may shoot an image based on the determined number of frames shot for each second.

Referring to FIG. 11B, the electronic device 101, according to an embodiment of the present disclosure, may be mounted onto a flight vehicle 1120 that does not include a communication function, and may fly. The flight vehicle 1120 may include, for example, a boomerang. The electronic device 101 is mounted onto the flight vehicle 1120 and may shoot an image through at least one unit lens during flight. Alternatively, the electronic device 101 may determine the number of frames shot for each second in association with image shooting based on the speed of flight, and may shoot an image based on the determined number of frames shot for each second.

Referring to FIG. 11C, the electronic device 101, according to an embodiment of the present disclosure, may be mounted onto a drone 1130, and may fly. The drone 1130 may include a communication function, and the flight thereof may be controlled by the electronic device 101. The electronic device 101 may transmit, to the drone 1130, a control signal for controlling the flight of the drone 1130, and the drone 1130 may receive the control signal and may control flight. Alternatively, the electronic device 101 may receive a control signal for controlling the flight of the drone 1130 from the external electronic device 102, and may transmit the received control signal to the drone 1130. In this instance, the drone 1130 may receive the control signal, and may control flight. The communication between the electronic device 101 and the external electronic device 102 may be performed through short-range communication, such as WI-FI®, BLUETOOTH®, or the like.

Figure 12A:
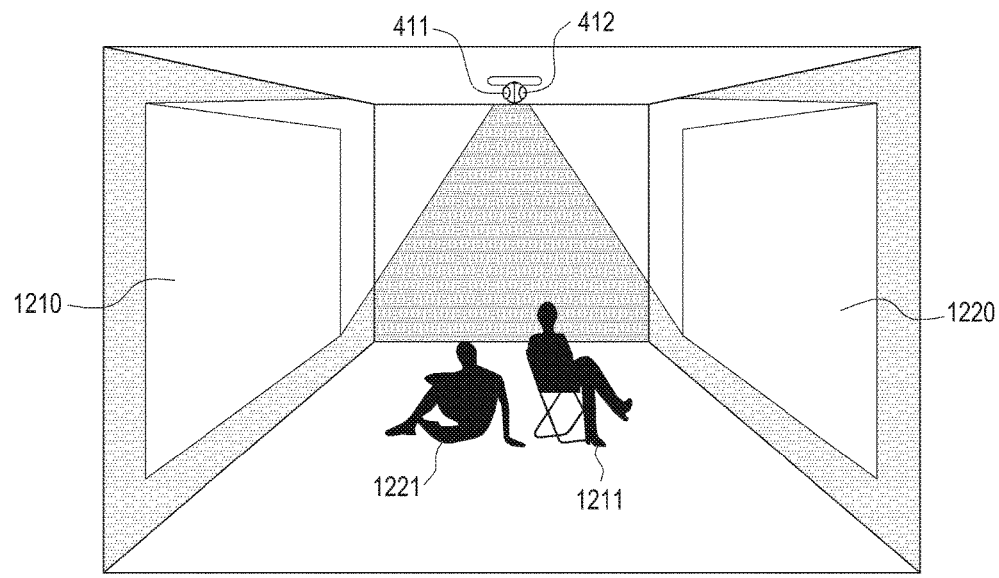
FIG. 12A illustrates an example of outputting an image using an electronic device according to an embodiment of the present disclosure.
Figure 12B:
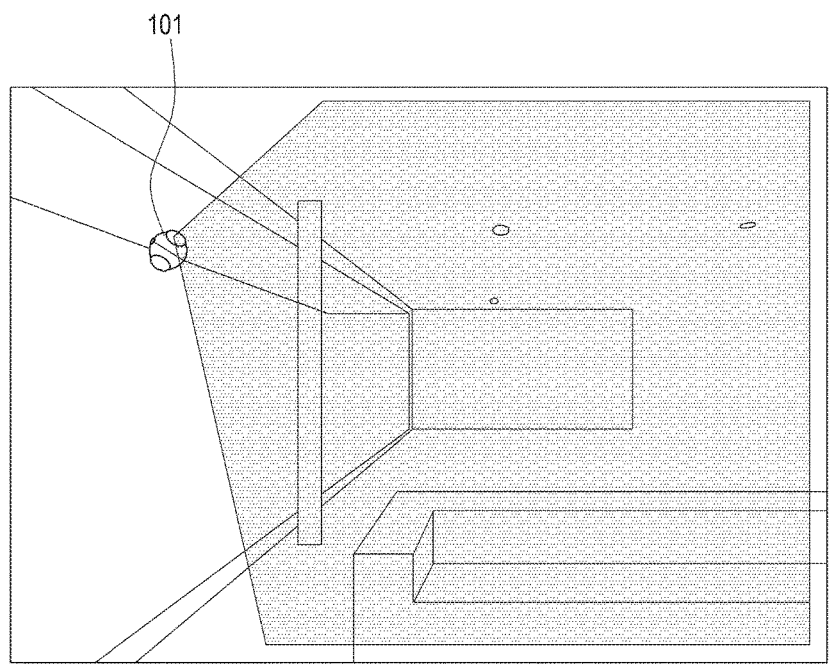
FIG. 12B is a diagram illustrating an example of shooting an image using an electronic device according to an embodiment of the present disclosure.
Figure 12C:
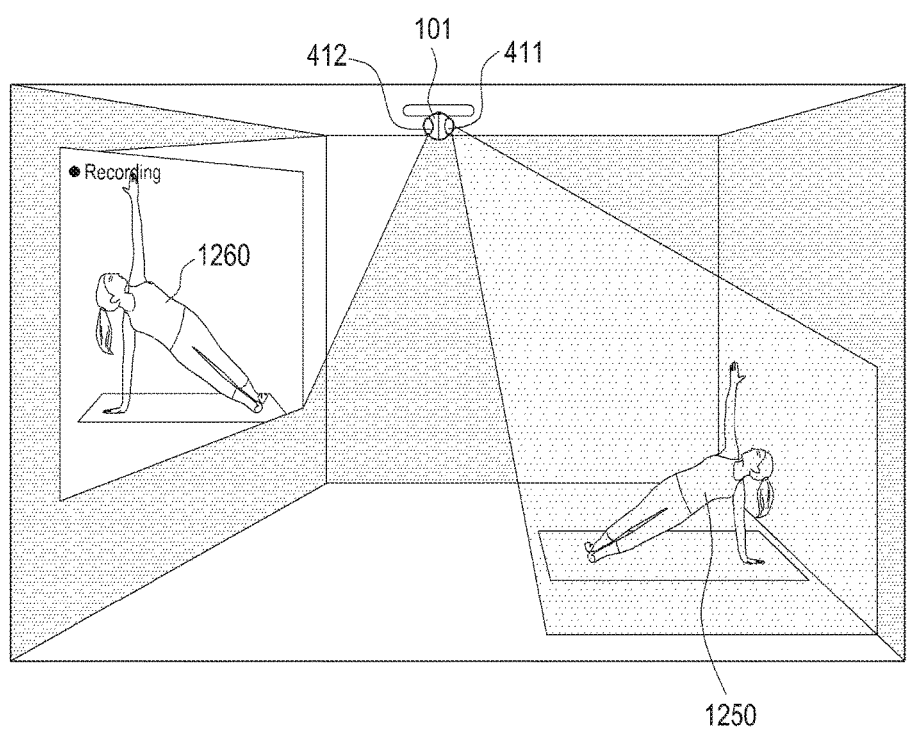
FIG. 12C is a diagram illustrating an example of simultaneously performing image shooting and image outputting using an electronic device according to an embodiment of the present disclosure.

FIG. 12A illustrates an example of outputting an image using an electronic device according to an embodiment of the present disclosure. FIG. 12B illustrates an example of shooting an image using an electronic device according to an embodiment of the present disclosure. FIG. 12C illustrates an example of simultaneously performing image shooting and image outputting using an electronic device according to an embodiment of the present disclosure.

Referring to FIG. 12A, the electronic device 101, according to an embodiment of the present disclosure, may output an image simultaneously through the first single lens 411 and the second single lens 412. The electronic device 101 may output the same image or may output different images through the first single lens 411 and the second single lens 412. The image output through the first single lens 411 may be projected onto a first wall surface 1210 and the image output through the second single lens 412 may be projected onto a second wall surface 1220. As described above, the electronic device 101 outputs the same image or different images, and thus, a first user 1221 and a second user 1211 may view the same image at the different locations, and may also view different images.

Referring to FIG. 12B, the electronic device 101, according to an embodiment of the present disclosure, may be used as a device for shooting an image, such as a CCTV. The electronic device 101 may be attached to a wall surface by using an external cover. As described above, when the connection of an external cover is sensed, the electronic device 101 may determine a type of external cover, and may control a function associated with at least one of image shooting and image outputting. The electronic device 101 may transmit a shot image to the external electronic device 102. Alternatively, an angle of view of each unit lens that shoots an image in the electronic device 101 may be adjusted based on a control signal transmitted from the external electronic device 102.

Referring to FIG. 12C, the electronic device 101, according to an embodiment of the present disclosure, may shoot a subject 1250 through the first single lens 411 and may output an image 1260 of the shot subject through the second single lens 412. Alternatively, the electronic device 101 may output, through the second single lens 412, the image of the subject 1250 which is shot through the first single lens 411, in parallel. The electronic device 101 outputs, through the second single lens 412, an image that is shot through the first single lens 411 in real time, and thus, the user 1250 may view the image 1260 obtained by shooting the user in real time.

Figure 13:
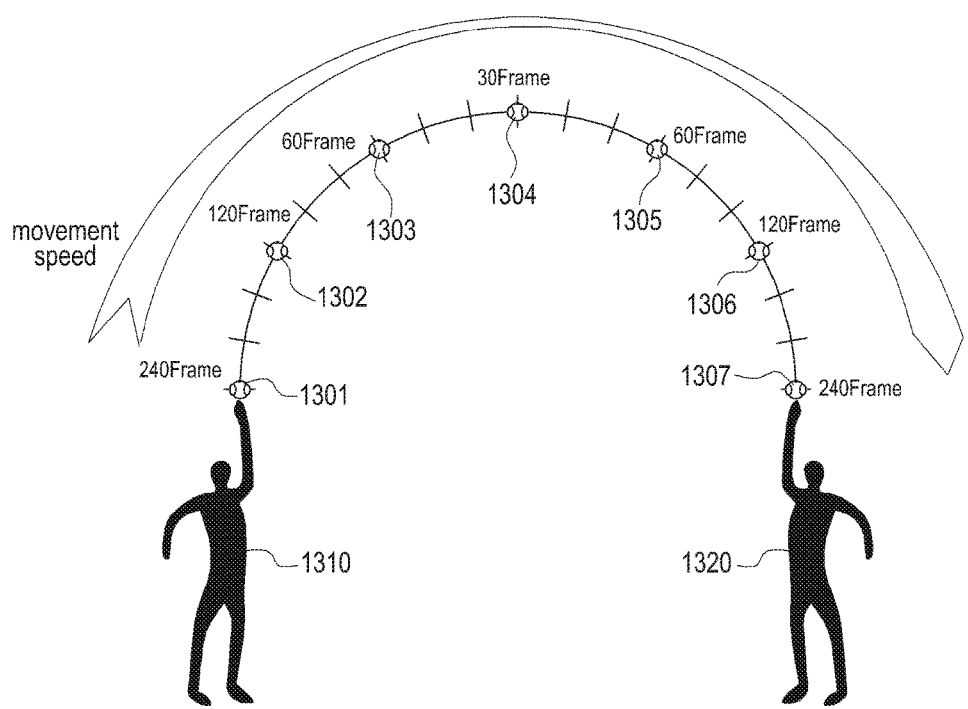
FIG. 13 illustrates an example of shooting an image based on a movement speed of an electronic device according to an embodiment of the present disclosure.

FIG. 13 illustrates an example of shooting an image based on a movement speed of an electronic device according to an embodiment of the present disclosure.

Referring to FIG. 13, the electronic device 101 may sense a movement speed, may determine the number of frames shot for each second in association with image shooting based on the sensed movement speed, and may shoot an image based on the determined number of frames shot for each second. For example, when a first user 1310 throws the electronic device 101 to a second user, the electronic device 101 may move in an arc. The electronic device 101 may measure a movement speed in real time as the movement is made. When the movement speed is fast, the electronic device 101 increases the number of frames shot for each second and shoots an image. When the movement speed is slow, the electronic device 101 decreases the number of frames shot for each second and shoots an image.

Generally, when an object moves in an arc, a speed at a point where the object is thrown and a speed at a point where the object is received are the maximum value, but a speed at the highest position of the object may be the minimum value. The speed of the electronic device at a first location 1301 is the maximum value, and the electronic device may shoot an image at 240 frames/second. The speed of the electronic device at a second location 1302 is slower than the speed of the electronic device at the first location 1301, and thus, the electronic device may shoot an image at 120 frames/second, which is lower than 240 frames/second at the first location. The speed of the electronic device at a third location 1303 is slower than the speed of the electronic device at the second location 1302, and thus, the electronic device may shoot an image at 60 frames/second, which is lower than 120 frames/second at the second location. The speed of the electronic device at a fourth location 1304 is the minimum value, and the electronic device may shoot an image at 30 frames/second. The speed of the electronic device at a fifth location 1305 is faster than the speed of the electronic device at the fourth location 1304, and thus, the electronic device may shoot an image at 60 frames/second, which is higher than 30 frames/second at the fourth location. The speed of the electronic device at a sixth location 1306 is faster than the speed of the electronic device at the fifth location 1305, and thus, the electronic device may shoot an image at 120 frames/second, which is higher than 60 frames/second at the fifth location. Also, the speed of the electronic device at a seventh location 1307 may be the same as the speed of the electronic device at the first location 1301 theoretically, and thus, the electronic device may shoot an image at 240 frames/second, which is the same as that of the electronic device at the first location 1301. Also, the speed of the electronic device at the seventh location 1307 is faster than the speed of the electronic device at the sixth location 1306, and thus, the electronic device may shoot an image at 240 frames/second, which is higher than 120 frames/second at the sixth location. As described above, the electronic device 101 may sense a movement speed, may determine the number of frames shot for each second in association with image shooting based on the sensed movement speed, and may shoot an image based on the determined number of frames shot for each second.

Figure 14A:
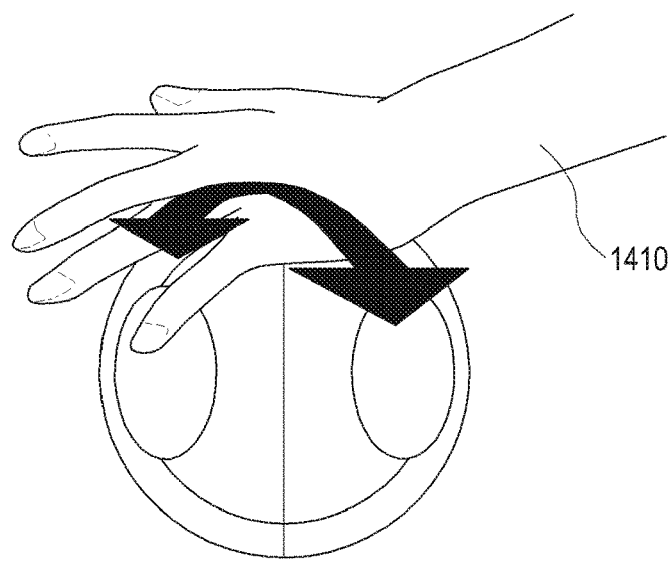
FIG. 14A illustrates an example of controlling an electronic device through a button mounted to the exterior of an electronic device according to an embodiment of the present disclosure.
Figure 14B:
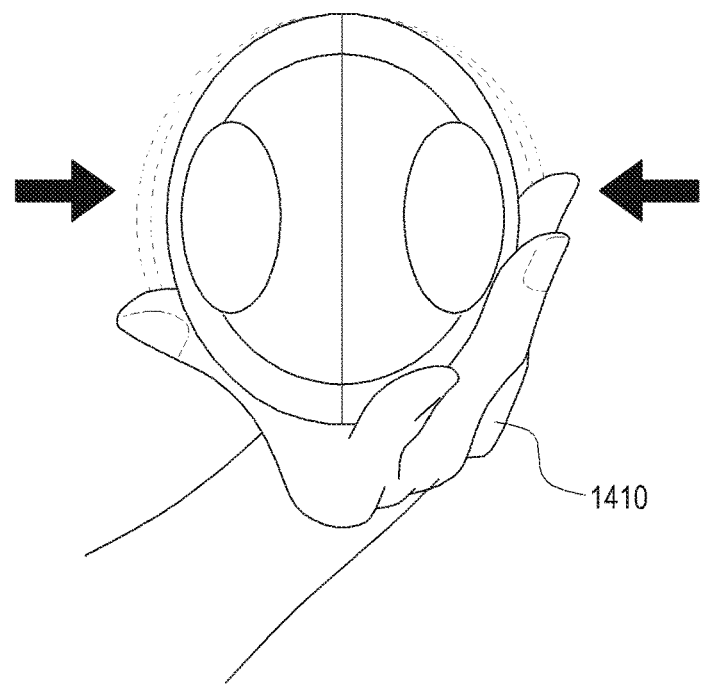
FIG. 14B illustrates an example of controlling an electronic device by applying a pressure on an external device that encloses an electronic device according to an embodiment of the present disclosure.

FIG. 14A illustrates an example of controlling an electronic device through a button mounted to the exterior of an electronic device according to an embodiment of the present disclosure. FIG. 14B illustrates an example of controlling an electronic device by applying a pressure on an external device that encloses an electronic device according to an embodiment of the present disclosure.

Referring to FIGS. 14A and 14B, the electronic device 101 may include an input/output unit 450 in the exterior of the electronic device 101. The input/output unit 450 may include at least one out of: a plurality of buttons (not illustrated), a microphone (not illustrated), a speaker (not illustrated), a vibration motor (not illustrated), an earphone connecting jack (not illustrated), and a sensor (not illustrated). The button (not illustrated) and the sensor (not illustrated) may be formed in the front side, a lateral side, or the back side of the housing of the electronic device 101, and may sense a pressure and a depressure. The button and the sensor may sense a pressure corresponding to force that comes from the outside while in the state in which the electronic device 101 is covered with an external cover. The sensor may sense at least one of a shake of the electronic device 101 and a pressure applied on the electronic device 101.

According to various embodiments of the present disclosure, the electronic device 101 may control one out of: turning on/off the electronic device 101, turning on/off the image shooting, and turning on/off the image outputting, through a pressure, a touch, or the like that is input through the button and the sensor unit. For example, the electronic device 101 may activate (ON) an image shooting or an image outputting when a single input is sensed through a button, and may deactivate (OFF) the image shooting or the image outputting when two inputs are sensed. Alternatively, for example, the electronic device 101 may activate (ON) an image shooting or an image outputting when a single shake is sensed through a sensor, and may deactivate (OFF) the image shooting or the image outputting when two inputs are sensed. Alternatively, when a control signal which is used for controlling one of turning on/off the electronic device 101, turning on/off the image shooting, and turning on/off the image outputting, is received through the communication unit 480, the electronic device 101 may control one of turning on/off the electronic device 101, turning on/off the image shooting, and turning on/off the image outputting based on the received control signal.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

According to various embodiments of the present disclosure, there is provided a storage medium storing instructions, and the instructions are set to enable at least one processor to perform at least one operation when the instructions are executed by at least one processor, wherein the at least one operation includes: an operation of determining image shooting or image outputting; and an operation of controlling a function associated with at least one determined mode out of image shooting and image outputting, to be performed through a single lens contained in the electronic device.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling image shooting and image outputting in an electronic device, the method comprising:
   determining whether to shoot an image or output the image;
   in response to determining to shoot the image, controlling a variable reflecting plate in a first direction while the electronic device is shooting the image through a single lens contained in the electronic device; and
   in response to determining to output the image, controlling the variable reflecting plate in a second direction different from the first direction while the electronic device is outputting the image through a single lens contained in the electronic device.

2. The method of claim 1, further comprising:
   detecting an external device that is connected to the electronic device,
   wherein the determining whether to shoot the image or output the image comprises determining whether to shoot the image or output the image based on a type of the external device.

3. The method of claim 1, further comprising:
   in response to determining to output the image, controlling another variable reflecting plate in a third direction while the electronic device is outputting the image through another
   single lens contained in the electronic device.

4. The method of claim 1, further comprising:
   in response to determining to shoot the image and output the image, controlling the variable reflecting plate in the first direction in order that the electronic device is shooting the image through the single lens contained in the electronic device, and controlling another variable reflecting plate in a third direction in order that the electronic device is outputting the image through another
   single lens contained in the electronic device.

5. The method of claim 1, further comprising:
   sensing a movement speed of the electronic device;
   determining a number of frames shot for each second in association with the image shooting, based on the sensed movement speed; and
   shooting an image based on the determined number of frames shot for each second.

6. The method of claim 1, further comprising:
   sensing at least one of a shake of the electronic device or a pressure applied on the electronic device; and
   controlling turning on/off the electronic device, turning on/off the image shooting, or turning on/off the image outputting based on the sensing.

7. An electronic device for controlling image shooting and image outputting, the electronic device comprising:
   a lens unit;
   a variable reflecting plate; and
   a controller configured to:
      determine whether to shoot an image or output the image,
      in response to determining to shoot the image, control the variable reflecting plate in a first direction while the electronic device is shooting the image through the lens unit, and
      in response to determining to output the image, control the variable reflecting plate in a second direction different from the first direction while the electronic device is outputting through a single lens contained in the lens unit.

8. The electronic device of claim 7, further comprising:
   a connection unit configured to connect with an external device,
   wherein the controller determines whether to shoot an image or output the image based on a type of the external device connected to the connection unit.

9. The electronic device of claim 7, wherein the electronic device is in a spherical shape, and
   wherein the lens unit includes:
      a first single lens that is formed in one side of the sphere and has an angle of view of 180 degrees, and
      a second single lens that is formed in another side of the sphere and has an angle of view of 180 degrees.

10. The electronic device of claim 9, further comprising:
a converter configured to convert to the image shooting or image outputting,
wherein the converter includes:
a first converter configured to connect to the first single lens, and
a second converter configured to connect to the second single lens.

11. The electronic device of claim 10, wherein each of the first converter and the second converter comprises:
an image outputting unit including a display unit and a projector module; and
an image shooting unit including an image sensor and a camera module.

12. The electronic device of claim 9, further comprising:
a converter configured to provide the image shooting or the image outputting, wherein the converter comprises:
a first converter configured to connect to the first single lens, and
a second converter configured to connect to the second single lens.

13. The electronic device of claim 12, wherein each of the first converter and the second converter comprises:
a bilateral display unit configured to sense or display an image if the electronic device operates in association with the image shooting, and
a light emitting unit configured to output an image if the electronic device operates in association with the image outputting.

14. The electronic device of claim 9, wherein the controller is configured to:
in response to determining to shoot the image, control the variable reflecting plate in the first direction in order that the electronic device is shooting the image through the first single lens.

15. The electronic device of claim 9, further comprising another variable reflecting plate, wherein the controller is configured to:
in response to determining to shoot the image, control the variable reflecting plate in the first direction in order that the electronic device is shooting the image through the first single lens, and
in response to determining to output the image, control the another variable reflecting plate in a third direction in order that the electronic device is outputting the image through the second single lens.

16. The electronic device of claim 9, wherein the controller is further configured to control the variable reflecting plate in the first direction in order that the electronic device is shooting the image through the first single lens and control another variable reflecting plate in a third direction in order that the electronic device is outputting the image through the second single lens in response to determining to shoot the image and output the image.

17. The electronic device of claim 7, further comprising:
a sensor unit configured to sense a movement speed of the electronic device, wherein the controller is configured to:
determine a number of frames shot for each second in association with the image shooting based on the sensed movement speed, and
shoot an image based on the determined number of frames shot for each second.

18. The electronic device of claim 17, wherein the sensor unit senses at least one of a shake of the electronic device or a pressure applied on the electronic device,
wherein the controller is configured to turn on/off the electronic device, turn on/off the image shooting, or turn on/off the image outputting, based on the sensing.

19. An external device comprising:
a cradle configured to dock with an electronic device including:
a lens unit; and
a controller configured to:
determine an image shooting or image outputting, and
control the determined out of the image shooting the image outputting to be performed through a single lens contained in the lens unit;
an external cover configured to connect to the electronic device, the external cover including micro suctions configured to absorb an impact applied to the electronic device or stick to a plane;
a hologram cover configured to enclose the electronic device;
a waterproofing cover; and
a flight vehicle configured to move the electronic device.

* * * * *